United States Patent
Igaki et al.

(10) Patent No.: US 6,488,109 B1
(45) Date of Patent: Dec. 3, 2002

(54) VEHICLE RUNNING STABILITY CONTROL APPARATUS

(75) Inventors: Munenaga Igaki, Toyota (JP); Masakatsu Nonaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/619,632

(22) Filed: Jul. 19, 2000

(30) Foreign Application Priority Data

Aug. 9, 1999 (JP) .......................................... 11-225372
Jun. 8, 2000 (JP) ........................................ 2000-172059

(51) Int. Cl.⁷ ............................................... B62D 1/24
(52) U.S. Cl. ...................... 180/169; 180/271; 180/274; 180/275
(58) Field of Search ............................. 180/271, 274, 180/275, 169

(56) References Cited

U.S. PATENT DOCUMENTS

| | | | |
|---|---|---|---|
| 4,379,497 A | * | 4/1983 | Hainsworth et al. ......... 180/168 |
| 4,779,095 A | * | 10/1988 | Guerreri ..................... 340/904 |
| 4,987,357 A | | 1/1991 | Masaki |
| 5,177,462 A | * | 1/1993 | Kajiwara .................... 340/435 |
| 5,332,057 A | | 7/1994 | Butsuen et al. |
| 5,540,298 A | * | 7/1996 | Yoshioka et al. ........... 180/169 |
| 5,572,428 A | | 11/1996 | Ishida et al. |
| 5,574,426 A | * | 11/1996 | Shisgal et al. .............. 340/435 |
| 5,873,802 A | | 2/1999 | Tabata et al. |
| 5,936,549 A | * | 8/1999 | Tsuchiya .................... 340/903 |

FOREIGN PATENT DOCUMENTS

EP 0 890 470 A2 1/1999
JP A-10-264795 10/1998

* cited by examiner

Primary Examiner—Kenneth R. Rice
Assistant Examiner—Christopher Buchanan
(74) Attorney, Agent, or Firm—Oliff & Berridge, PLC

(57) ABSTRACT

A vehicle stability control apparatus including a vehicle running stability control device for controlling an automotive vehicle for stable running of the vehicle, and a braking device for applying a brake to the vehicle, wherein a hazard detecting device or detecting a hazardous condition of the vehicle such as a collision of the vehicle with an obstacle and a deviation of the vehicle from the nominal running path, and an automatic brake application device is operable to activate the braking device, when the hazardous condition is detected at least during an operation of the vehicle running stability control device.

16 Claims, 16 Drawing Sheets

| β \ β' | $\beta' > \beta'_1$ | $\beta'_1 \geqq \beta' > \beta'_2$ | $\beta'_2 \geqq \beta'$ |
|---|---|---|---|
| $\beta > \beta_1$ | × | × | ○ |
| $\beta_1 \geqq \beta > \beta_2$ | × | ○ | ○ |
| $\beta_2 \geqq \beta$ | ○ | ○ | ○ |

× : IMPOSSIBLE TO PREVENT VEHICLE DEVIATION

○ : POSSIBLE TO PREVENT VEHICLE DEVIATION

VEHICLE RUNNING STABILITY CONTROL APPARATUS

This application is based on Japanese Patent Application Nos. 11-225372 filed Aug. 9, 1999 and 2000-172059 filed Jun. 8, 2000, the contents of which are incorporated hereinto by reference.

BACKGROUND OF THE INVENTION

1. Field of the Invention

The present invention relates in general to a vehicle stability control apparatus adapted to assure stable running of an automotive vehicle, and more particularly to techniques for improving running safety of the vehicle.

2. Discussion of Related Art

A so-called "vehicle stability control (VSC)" is known, wherein a vehicle running stability control device is operated under a hazardous running condition of an automotive vehicle, to apply a brake to at least one wheel of the vehicle, and/or reduce an output of an engine of the vehicle, as disclosed in U.S. Pat. No. 5,873,802 by was of example. Under some running conditions of the vehicle, a vehicle running stability control is not sufficient or effective to assure stable running or turning of the vehicle, namely, to safely clear an obstacle or prevent a collision of the vehicle with the obstacle, or to prevent a deviation of the running vehicle from the nominal running path or traffic lane of the vehicle. JP-A-10-264795 discloses an example of an improved vehicle stability control apparatus which is adapted to deal with such a problem that may happen under severe vehicle running conditions beyond the capacity of the conventional vehicle stability control. This apparatus is equipped with a CCD (charge-coupled device) camera for obtaining an image of a scene in front of the vehicle as seen by the vehicle operator in the vehicle running direction. Described more specifically, the improved vehicle stability control apparatus incorporates obstacle-clearance determining means for detecting an obstacle which lies in front of the vehicle in a running path of the vehicle, on the basis of image data obtained by the CCD camera, and for determining whether it is possible to control the vehicle so as to prevent a collision of the vehicle with the obstacle. When the obstacle-clearance determining means determines that the vehicle running stability control does not permit the vehicle to be adequately controlled so as to clear the detected obstacle, the vehicle stability control apparatus terminates its vehicle stability control upon detection of a vehicle operator's manipulation to prevent a collision of the vehicle with the obstacle.

The vehicle stability control apparatus disclosed in the above-identified publication is arranged such that the vehicle operator's manipulation of the vehicle is predominant over the control performed by the vehicle running stability control apparatus, in the event that a collision of the vehicle with the obstacle is highly expected in the process of the vehicle running stability control, so that the vehicle collision with the obstacle can be prevented, rather than the vehicle running or turning stability control is continued. Accordingly, the apparatus assures safe running of the vehicle even under severe running conditions beyond the vehicle running stability control. However, the apparatus relies upon an adequate manipulation of the vehicle operator to clear the obstacle by brake application to the vehicle and/or operating the steering wheel. In some emergency cases, the vehicle operator may bet at a loss or get puzzled with a hazardous running condition of the vehicle, and cannot take an appropriate measure to adequately control the vehicle. If the vehicle operator did not manipulate the vehicle at all under such a hazardous running condition, the vehicle running stability control would be continued, leading to a possibility of the vehicle collision with the obstacle. When the vehicle-operator's manipulation is performed, the vehicle running stability control is terminated, but the vehicle collision with the obstacle cannot be prevented if the manipulation is not adequate.

SUMMARY OF THE INVENTION

It is therefore an object of the present invention to provide a vehicle stability control apparatus which assures safe running of the vehicle without an adequate manipulation of the vehicle by the vehicle operator in the event of a determination that there is a risk of a collision of the vehicle with an obstacle or a deviation of the vehicle from the nominal running path or traffic lane of the vehicle.

The above object may be achieved by a vehicle stability control apparatus according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A vehicle stability control apparatus comprising a vehicle running stability control device for controlling an automotive vehicle for stable running of the vehicle, and a braking device for applying a brake to the vehicle, said apparatus further comprising:

a hazard detecting device for detecting a hazardous condition of the vehicle; and an automatic brake application device operable to activate the braking device, when the hazard detecting device has detected the hazardous condition of the vehicle at least during an operation of the vehicle running stability control device.

In the conventional vehicle stability control apparatus, an operation of the vehicle running stability control device is terminated upon determination that there is a risk of a collision of the vehicle with an obstacle, if the vehicle operator has operated the braking device and also operated the steering wheel during the operation of the vehicle running stability control device, and if the direction of operation of the steering wheel permits the vehicle to clear the obstacle.

In the vehicle stability control apparatus according to the above mode (1) of this invention, the vehicle is automatically braked by the automatic brake application device, to assure a safe state of the vehicle, without an adequate manipulation of the vehicle by the vehicle operator, upon detection of a hazardous condition of the vehicle during an operation of the vehicle running stability control device, for instance, in the event of determination that there is a risk of a collision of the vehicle with an obstacle or a deviation of the vehicle from the nominal running path, during an operation of the vehicle running stability control device. The automatic brake application device may or may not be operated to automatically brake the vehicle upon detection of the hazardous condition of the vehicle while the vehicle running stability control device is not in operation.

(2) A vehicle stability control apparatus according to the above mode (1), wherein the hazard detecting device includes an obstacle detecting device for detecting an obstacle in front of the vehicle as seen in a running direction of the vehicle, and the automatic brake application device is operated to activate the braking device, when an output of the obstacle detecting device at least during an operation of the vehicle running stability device indicates that there is a risk of a collision of the vehicle with the obstacle.

In the vehicle stability control apparatus according to the above mode (2), the vehicle is automatically braked by the automatic brake application device, to prevent the collision of the vehicle with the obstacle, without a manipulation of the vehicle by the vehicle operator, in the event of determination that there is a risk of the vehicle collision while the vehicle running stability control device is in operation. The automatic brake application device may or may not be operated in the event of determination of the presence of the risk of the vehicle collision while the vehicle running stability control device is not in operation.

(3) A vehicle stability control apparatus according to the above mode (2), wherein the automatic brake application device is operated during an operation of the vehicle running stability control device, when the output of the obstacle detecting device indicates that there is the risk of the collision of the vehicle with the obstacle.

In the vehicle stability control apparatus according to the above mode (3), the automatic brake application device is operated when it is determined that there is a risk of the vehicle collision with the vehicle while the vehicle running stability control device is in operation to improve the running stability of the vehicle. The operation of the vehicle running stability control device means that the vehicle is running in some hazardous condition. Accordingly, when the output of the obstacle detecting device indicates a risk of the vehicle collision with the obstacle during an operation of the vehicle running stability control device, it is generally difficult for the vehicle operator to manipulate the vehicle, that is, to operate the braking device and the steering wheel, so as to safely clear the obstacle. In other words, the vehicle operator's manipulation of the vehicle is not necessarily sufficient or effective to prevent the vehicle collision with the obstacle. In the present vehicle stability control apparatus, on the other hand, the automatic brake application device assures an adequate brake application to the vehicle to safely prevent the vehicle collision with the obstacle, even in such an event.

(4) A vehicle stability control apparatus according to the above mode (1), wherein the hazard detecting device includes a vehicle-deviation determining device for determining whether there is a risk of a deviation of the vehicle from a nominal running path of the vehicle, the automatic brake application device being operable to activate said braking device, when an output of the vehicle-deviation determining device at least during an operation of said vehicle running stability control device indicates that there is said risk of the deviation of the vehicle from the nominal running path.

In the vehicle stability control apparatus according to the above mode (4), the vehicle is automatically braked by the automatic brake application device, to prevent the deviation of the vehicle from the nominal running path, without a manipulation of the vehicle by the vehicle operator, in the event of determination that there is a risk of the vehicle deviation while the vehicle running stability control device is in operation. The automatic brake application device may or may not be operated in the event of determination of the presence of the risk of the vehicle deviation while the vehicle running stability control device is not in operation.

(5) A vehicle stability control apparatus according to the above mode (4), wherein the automatic brake application device is operated during an operation of the vehicle running stability control device, when the output of the vehicle-deviation determining device indicates that there is the risk of the deviation of the vehicle from the nominal running path.

In the vehicle stability control apparatus according to the above mode (5), the automatic brake application device is operated when it is determined that there is a risk of the vehicle deviation from the nominal running path, while the vehicle running stability control device is operated to improve the running stability of the vehicle. The operation of the vehicle running stability control device means that the vehicle is running in some hazardous condition, in which the vehicle operator rarely has an intention to change the traffic lane from the present one to the adjacent one. That is, the vehicle deviation indicated by the output of the vehicle-deviation determining device is not desired by the vehicle operator, and must therefore be prevented by automatic brake application to the vehicle by operation of the automatic brake application device.

(6) A vehicle stability control apparatus according to the above mode (4) or (5), wherein the vehicle-deviation determining device includes a lane detecting device for detecting a lane-defining line which defines a traffic lane on which the vehicle is running, the vehicle-deviation determining device determining that there is a risk of the deviation of the vehicle from the nominal running path, when an angle between the lane-defining line detected by the lane detecting device and a longitudinal direction of the vehicle is larger than a predetermined upper limit.

The determination as to whether there is a risk of deviation of the vehicle from the nominal running path may be effected by detecting the traffic lane on which the vehicle is running, and estimating the running path along which the vehicle is going to run. However, the vehicle-deviation determining device of the vehicle stability control apparatus according to the above mode (6) of the invention is adapted to make the determination on the basis of the longitudinal direction of the vehicle as compared with the detected lane-defining line. This manner of determination is relatively simple, and the vehicle-deviation determining device is available at a reduced cost. However, the vehicle-deviation determining device may include a running-path estimating device for estimating the vehicle running path, as well as the lane detecting device.

(7) 7. A vehicle stability control device according to the above mode (6), wherein the vehicle-deviation determining device further includes a running-path estimating device for estimating an actual running path of the vehicle, on the basis of a yaw rate of the vehicle.

The vehicle-deviation determining device is capable of determining, with increased reliability, whether there is a risk of the vehicle deviation from the nominal running path, on the basis of not only the angle of the longitudinal direction of the running vehicle with respect to the lane-defining line, but also the angular velocity of the turning vehicle.

(8) A vehicle stability control device according to the above mode (6) or (7), wherein the vehicle-deviation determining device includes an image obtaining device for obtaining image data representative of an image of a scene in front of the vehicle as seen in a longitudinal direction of the vehicle, and an image-data processing device for processing the image data to determine a lane-defining line which defines a traffic lane on which the vehicle is running.

The image-data processing device of the vehicle-deviation determining device in the vehicle stability control apparatus according to the above mode (8) may be arranged to process the image data to determine the lane-defining line, on the basis of a difference in brightness or luminance between the lane-defining line and the roadway surface on which the vehicle is running. In this respect, it is noted that the lane-defining line is usually a white line having a comparatively high degree of luminance.

(9) A vehicle stability control device according to any one of the above modes (1)–(8), further comprising running stability control terminating device for terminating the operation of the vehicle running stability control device when the braking device is activated by the automatic brake application device.

If the automatic brake application to the vehicle by the braking device activated by the automatic brake application device were effected concurrently with the vehicle running stability control by the vehicle running stability control device, the automatic brake application and the vehicle running stability control would interfere with each other, causing an undesirable result regarding the running condition of the vehicle. In the vehicle stability control apparatus according to the above mode (9), the vehicle running stability control device is turned off when the automatic brake application is initiated by activation of the braking device by the automatic brake application device, so that the hazardous condition of the vehicle such as the vehicle collision with an obstacle or the vehicle deviation from the nominal running path can be prevented with increased reliability and stability.

(10) A vehicle stability control apparatus according to any one of the above modes (1)–(9), wherein said automatic brake application device controls said braking device to brake all of a plurality of wheels of the vehicle such that a total braking force generated by the all of said plurality of wheels is equal to a predetermined maxim value.

In the vehicle stability control apparatus according to the above mode (10), the vehicle is effectively braked with the maximum braking force, to assure improved safety of the vehicle, when the hazard detecting device has detected a hazardous condition of the vehicle such as the vehicle collision with an obstacle or the vehicle deviation from the nominal running path.

(11) A vehicle-collision preventing apparatus for preventing a collision of an automotive vehicle with an obstacle, comprising:
  a braking device for applying a brake to the vehicle;
  a running-path estimating device for estimating a running path of the vehicle;
  an obstacle detecting device for detecting an obstacle existing in front of the vehicle and in the running path of the vehicle estimated by the running-path estimating device;
  a vehicle speed detecting device for detecting a running speed of the vehicle;
  a vehicle-collision determining device for determining, on the basis of the running speed of the vehicle detected by the vehicle speed detecting device, whether there is a risk of a collision of the vehicle with the obstacle detected by the obstacle detecting device on an assumption that the vehicle is braked at a predetermined reference deceleration value; and
  an automatic brake application device operable to activate the braking device to brake the vehicle at a deceleration value whose absolute value is larger than that of the reference deceleration value, when the vehicle-collision determining device has determined that there is the risk of the collision of the vehicle with the obstacle.

In the vehicle-collision preventing apparatus according to the above mode (11) of this invention, the vehicle is automatically braked upon determination that there is a risk of a collision of the vehicle with an obstacle, irrespective of whether a vehicle running stability control is effected or not. The reference deceleration value may be a fixed value, for instance, about 0.5 G, or a variable which varies depending upon the detected vehicle running speed and/or other parameters indicative of the vehicle running condition. The deceleration value to be established by the automatic brake application under the control of the automatic brake application device may be slightly larger than the reference deceleration value, so that the vehicle can be braked to prevent the vehicle collision with high stability. Alternatively, the deceleration value to be established by the automatic brake application may be a highest possible value in order to minimize the vehicle running distance required to stop the vehicle. Further, the deceleration value to be established by the automatic brake application may be determined depending upon the detected vehicle running speed, a distance between the vehicle and the obstacle, and other parameters.

(12) A vehicle-collision preventing apparatus according to the above mode (11), wherein the running-path estimating device, the vehicle speed detecting device and the vehicle-collision determining device are kept operated even after an operation of the braking device is initiated by the automatic brake application device, the vehicle-collision determining device including deceleration increasing means for increasing the absolute value of the deceleration value to be established by the operation of the braking device under the control of the automatic brake application device, as long as the vehicle-collision determining device keeps determining that there is the of the collision of the vehicle with the obstacle.

In the vehicle-collision preventing apparatus according to the above mode (12), the deceleration value to be established by the operation of the braking device under the control of the automatic brake application device is gradually increased from a predetermined initial value. The running-path estimating device and the vehicle-collision determining device are adapted to repeatedly estimate the vehicle running path and determine where there is a risk of the vehicle collision, on the basis of the currently established deceleration value, each time the deceleration value is updated, i.e., increased. As long as the vehicle-collision determining device continues to determine that there is a risk of the vehicle collision, the deceleration value to be established by the automatic brake application is increased. If the vehicle-collision determining means determines that there is no longer a risk of the vehicle collision, the presently established deceleration value is maintained. Thus, the present arrangement does not cause an unnecessarily high rate of increase in the deceleration value of the vehicle. The deceleration value to be established by the automatic brake application may be determined on the basis of the predetermined reference value used by the vehicle-collision determining means for effecting the initial determination. Alternatively, the deceleration value to be established by the automatic brake application may be determined on the basis of the initial value of deceleration initially established immediately after the automatic brake application is initiated, or the last determined or established value. The deceleration value to be established may be incremented by a predetermined amount, or may be increased by an amount depending upon the currently detected vehicle speed or the currently detected actual deceleration value.

(13) A vehicle-deviation preventing apparatus for preventing a deviation of an automotive vehicle from a nominal running path of the vehicle, comprising:

a braking device for applying a brake to the vehicle;

a vehicle-deviation determining device for determining whether there is a risk of a deviation of the vehicle from a nominal running path; and an automatic brake application device operable to activate the braking device to brake the vehicle when the vehicle-deviation determining device has determined that there is the risk of the vehicle deviation from the nominal running path.

In the vehicle-deviation preventing apparatus according to the above mode (13) of this invention, the vehicle is automatically braked by the braking device under the control of the automatic brake application device when a risk of a vehicle deviation is detected, irrespective of whether a vehicle running stability control is performed or not.

(14) A vehicle-deviation preventing apparatus according to the above mode (13), further comprising an alarm indicator device operable when the vehicle-deviation determining means has determined that there is the risk of the deviation of the vehicle, to warn an operator of the vehicle that there is the risk.

In the vehicle-deviation preventing apparatus according to the above mode (14), the vehicle operator is warned of a fact that the automatic brake application to the vehicle is initiated to avoid the vehicle deviation from the nominal running path. Accordingly, the vehicle operator can be made ready for the automatic brake application. The alarm indicator device is preferably adapted to provide a warning indication before the automatic brake application is initiated. However, the warning indication may be provided before or upon the initiation of the automatic brake application, or after the initiation of the automatic brake application, for instance, immediately before or at the time when deceleration of the vehicle as a result of the automatic brake application is initiated. Where the warning indication is provided before the initiation of the automatic brake application, this warning indication is effective to prevent the vehicle operator from falling asleep while driving the vehicle.

(15) A vehicle-deviation preventing apparatus according to the above mode (13) or (14), further comprising an operator-controlled member, and an automatic-brake-application inhibiting device for inhibiting an operation of the automatic brake application device when the operator-controlled member is operated.

The feature of the vehicle-deviation preventing apparatus according to the above mode (15) of the invention is equally applicable to the apparatus according to any one of the above modes (1)–(12).

If the vehicle is automatically braked under the control of the automatic brake application device in response to a determination that there is a risk of the vehicle deviation from the nominal running path, when the vehicle operator is manipulating the steering wheel for the purpose of changing the traffic lane on the roadway from the present one to the adjacent one. In the apparatus according to the above mode (15) wherein the automatic-brake-application inhibiting device is provided, the automatic brake application to the vehicle contrary to the intention of the vehicle operator can be avoided. If the automatic brake application is inhibited after it is initiated, it is desirable to cancel an effect of the automatic brake application. The operator-controlled member whose operation triggers the automatic-brake-application inhibiting device may be an accelerator pedal, a steering wheel or other operator-controlled member usually provided on the vehicle. Where the accelerator pedal is utilized as the operator-controlled member to inhibit the automatic brake application, the inhibiting device inhibits the automatic brake application when the accelerator pedal is depressed. A depression of the accelerator pedal indicates the vehicle operator's intention to accelerate the vehicle, rather than decelerating the vehicle. Where the steering wheel is utilized as the operator-controlled member to inhibit the automatic brake application, the inhibiting device inhibits the automatic brake application when the steering wheel is rotated in a direction which is opposite to the direction in which the vehicle is deviating with respect to the nominal running path. Where the other operator-controlled members are utilized as the operator-controlled member to inhibit the automatic brake application, the inhibiting device inhibits the automatic brake application when an operation of the operator-controlled member satisfies a predetermined condition. The operator-controlled member may be a member exclusively provided for inhibiting the automatic brake application. It is also appreciated that the vehicle-deviation determining device may be operated in response to a control signal applied to a signaling device provided to indicate the direction of turning of the vehicle. In this case, for example, the vehicle-deviation determining device does not determine that there is a risk of the vehicle deviation, if the vehicle deviation follows the intention of the vehicle operator, more specifically, if the direction of deviation detected by the vehicle-deviation determining device is the same as the direction of turning of the vehicle represented by the control signal applied to the signaling device.

(16) A vehicle-deviation preventing apparatus according to the above mode (13), further comprising:

an alarm indicator device operable when the vehicle-deviation determining device has determined that there is the risk of the deviation of the vehicle, to warn an operator of the vehicle that there is the risk;

an operator-controlled member; and an automatic-brake-application inhibiting device for inhibiting an operation of the automatic brake application device when the operator-controlled member is operated, and wherein the automatic brake application device activates the braking device when a predetermined time has passed without an operation of the operator-controlled member after the alarm indicator device is operated.

In the vehicle-deviation preventing apparatus according to the above mode (16) wherein the vehicle operator is given a warning indication that the automatic brake is applied to the vehicle, before the automatic brake application is initiated. Accordingly, the vehicle operator who has been given the warning indication may easily inhibit the automatic brake application to the vehicle contrary to the vehicle operator's intention. The predetermined time between the moment of activation of the alarm indicator device and the moment of inhibition of the automatic brake application may be a predetermined fixed time which is considered necessary to allow the vehicle operator to decide whether the automatic brake application should be effected or not. The predetermined time may be changed depending upon the detected vehicle speed or the expected length of time during which the vehicle has deviated from the nominal running path. It is desirable that the vehicle-deviation determining device be adapted to determine the presence of a risk of the vehicle deviation, at a relatively early point of time so that the safe running state of the vehicle can be secured even after the predetermined time has passed after the activation of the alarm indicator device. In addition, it is desirable that the automatic brake application can be terminated when the operator-controlled member is operated even after the automatic brake application has been initiated.

(17) A vehicle-deviation preventing apparatus according to the above mode (16), wherein the vehicle-deviation determining device includes a time estimating portion for estimating a length of time during which the vehicle has deviated from the nominal running path, and a time determining portion for determining the above-indicated predetermined time on the basis of the estimated length of time.

In the vehicle-deviation preventing apparatus according to the above mode (16), the predetermined time between the moment of activation of the alarm indicator device and the moment of inhibition of the automatic brake application is determined on the basis of the estimated length of time during which the vehicle has deviated from the nominal running path. This arrangement permits the automatic brake application to be initiated before its inhibition by the automatic-brake-application inhibiting device if the estimated length of time is relatively short, and permits the automatic-brake-application inhibiting device to inhibit the automatic brake application depending upon the operation of the operator-controlled member, if the estimated length of time is relatively long.

(18) A vehicle stability control apparatus according to any one of the above modes (1)–(10), further comprising a vehicle stop indicator device operable when the braking device is operated by the automatic brake application device, for providing an indication that the vehicle is being braked.

(19) A vehicle-collision preventing apparatus according to the above mode (11) or (12), further comprising a vehicle stop indicator device operable when the braking device is operated by the automatic brake application device, for providing an indication that the vehicle is being braked.

(20) A vehicle-deviation preventing apparatus according to any one of the above modes (13)–(16), further comprising a vehicle stop indicator device operable when the braking device is operated by the automatic brake application device, for providing an indication that the vehicle is being braked.

In the apparatus according to any one of the above modes (18)–(20), the vehicle stop indicator device provides an indication of the automatic brake application to the vehicles so that the operators operating the trailing vehicles following the vehicle in question can know that the vehicle in question is being braked for an emergency stop. Thus, the vehicle stop indicator device assures improved safety of running of the trailing vehicles. The vehicle stop indicator device may include a hazard lamp whose illumination is visible by the operators of the trailing vehicles.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIGS. 6A and 6B are views showing edge extracting filters used in the image data processing device;

FIG. 11 is a data table used by the apparatus to determine whether it is possible to control the vehicle so as to prevent a deviation of the vehicle from the nominal running path or lane;

DETAILED DESCRIPTION OF THE PREFERRED EMBODIMENTS

Figure 1:
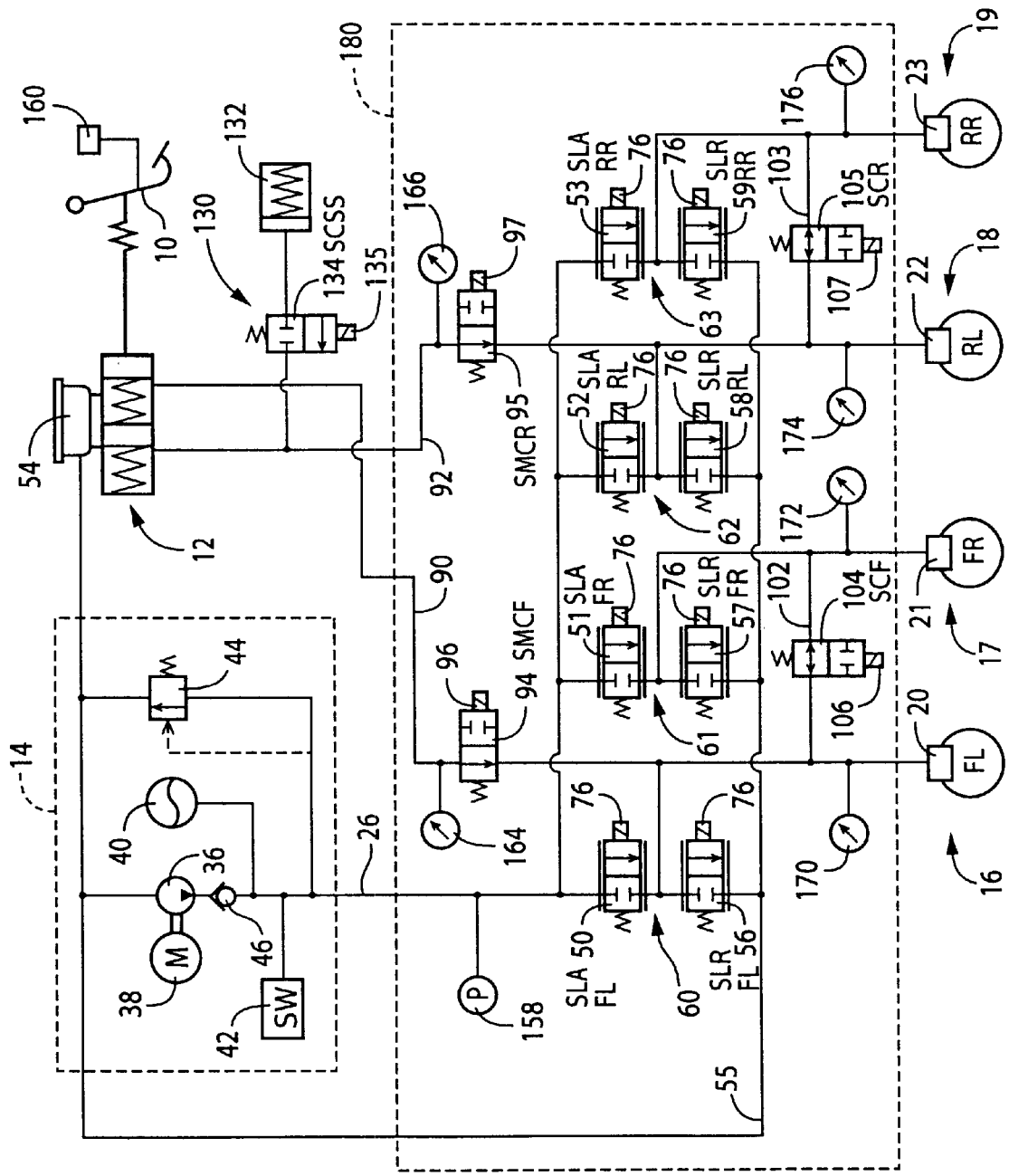
FIG. 1 is a diagrammatic view of a braking system including a vehicle stability control apparatus in the form of a running stability control apparatus for an automotive vehicle, which is constructed according to one embodiment of the present invention.

Referring first to FIG. 1, there is shown a braking system including a vehicle running stability control apparatus according to one embodiment of this invention. The present braking system is a hydraulically operated system.

The braking system includes a brake operating member in the form of a brake pedal 10, a master cylinder 12 having two pressurizing chambers, an electrically operated pump device 14, and four hydraulically operated wheel brakes 16, 17, 18 and 19 provided for front left and right wheels FL, FR, and rear left and right wheels RL, RR, respectively. The front wheels FL and FR are drive wheels for driving the vehicle. To the pump device 14, there are connected through a fluid passage 26 four wheel brake cylinders 20, 21, 22 and 23 of the respective wheel brakes 16–19, so that a working fluid pressurized by the pump device 14 is supplied to the wheel brake cylinders 20–23 through the fluid passage 26, for operating the wheel brakes 16–19.

The pump device 14 includes a pump 36, a pump motor 28 for operating the pump 36, and an accumulator 40 for storing the pressurized fluid delivered from the pump 36. The pump device 14 further includes a pressure 42 for detecting the fluid pressure in the accumulator 40, and the pump motor 38 is turned on and off according to an output signal of the pressure switch 42, so that the fluid pressure in the accumulator 40 is maintained within a predetermined range. The pump device 14 also includes a pressure relief valve 44 for reducing the fluid pressure in the accumulator 40 when the fluid pressure rises above the upper limit of the predetermined range. A check valve 46 is provided between the pump 36 and the accumulator 40, to prevent a flow of the fluid from the accumulator 40 back to the pump 36.

The fluid passage 26 is provided with four pressure-increasing linear solenoid valves 50, 51, 52 and 53, while a fluid passage 55 connecting the wheel brake cylinders 20–23 and a master reservoir 54 is provided with four pressure-reducing linear solenoid valves 56, 57, 58 and 59. These four pairs of pressure-increasing and pressure-reducing linear solenoid valves 50 and 56, 51 and 57, 52 and 58, and 53 and 59 constitute respective four linear solenoid valve devices 60, 61, 62 and 63. Each of the pressure-increasing linear solenoid valves 50–53 and the pressure-reducing linear solenoid valves 56–59 is a normally closed valve, which is brought to an open state upon application of an electric current to a coil 76.

Figure 2:
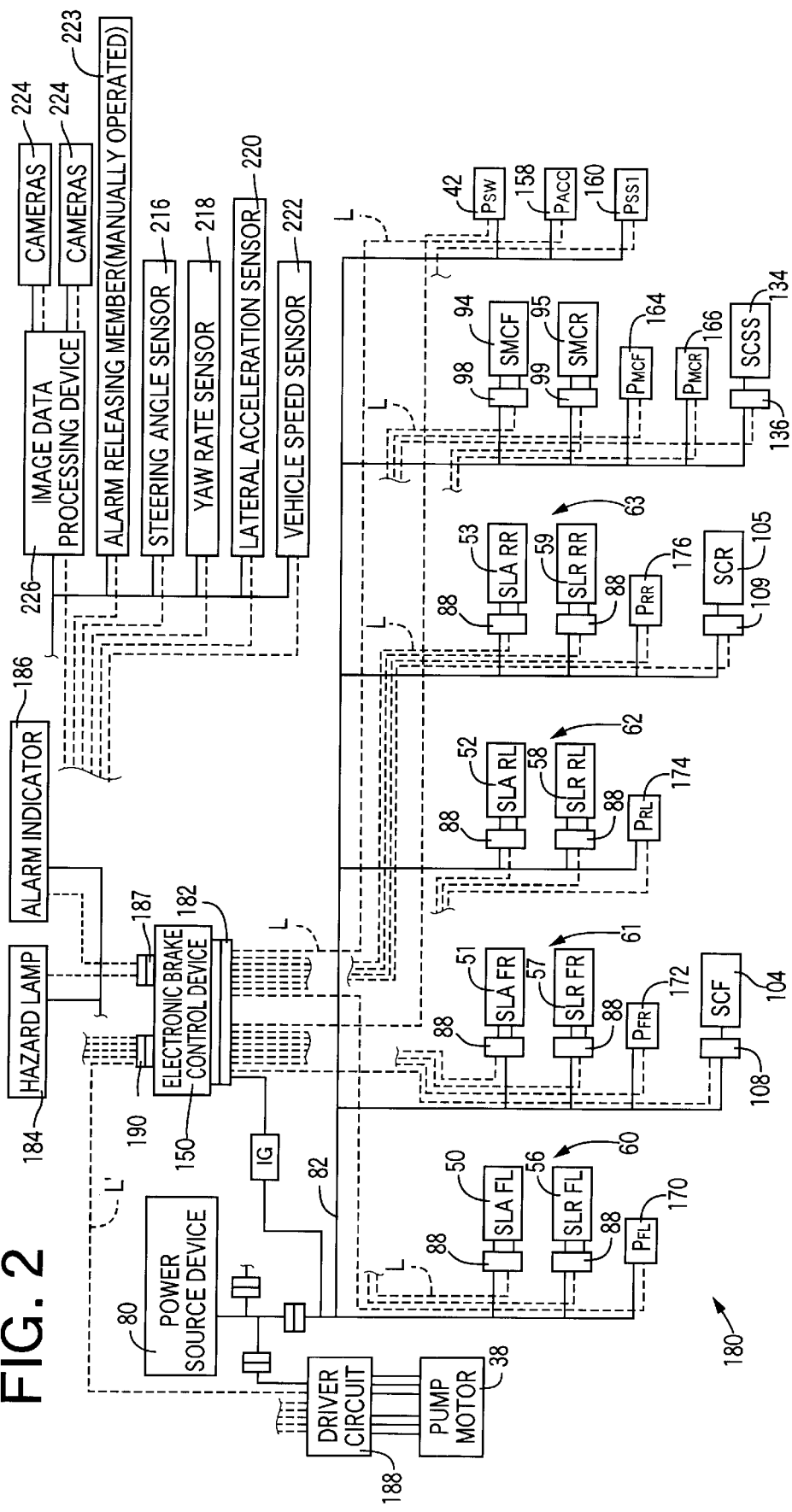
FIG. 2 is a diagrammatic view showing a control system of the vehicle running stability control apparatus of FIG. 1.

As shown in FIG. 2, the coil 76 of each linear solenoid valve 50–53, 56–59 is connected through a lead wire 82 and a driver circuit 88 to a power source device 80. The driver circuit 88 includes non-contact switches in the form of transistors which are turned on and off to apply an electric current to the coil 76 as needed.

To the two pressurizing chambers of the master cylinder 12, there are connected the respective wheel brake cylinders 20, 22 through respective fluid passages 90, 92. The two fluid passages 90, 92 are provided with respective master-cylinder cut-off valves 94, 95, which are closed and opened by energization and de-energization of coils 96, 97. Described in detail, the cut-off valves 94, 95 are held open while the coils 96, 97 are in a de-energized state. When the coils 96, 97 are energized with an electric current applied thereto, the cut-off valves 94, 95 are brought to a closed state. The coils 96, 97 are connected to respective driver circuits 98, 99, so that the coils 96, 97 are energized and de-energized to selectively place the cut-off valves 94, 95 in the closed and open states.

The two wheel brake cylinders 20, 21 for the front left and right wheels FL, FR are connected to each other through a communication passage 102, while the two wheel brake cylinders 22, 23 for the rear left and right wheels RL, RR are connected to each other through a communication passage 103. These two communication passages 102, 103 are provided with a front-brake communication valve 104 and a rear-brake communication valve 105, respectively. These valves 104, 105 are held open while coils 106, 107 are in a de-energized state, and are brought to a closed sate when the coils 106, 107 are energized. The coils 106, 107 are connected to respective driver circuits 108, 109, so that the coils 106, 107 are energized and de-energized to selectively place the valves 104, 105 in the closed and open states.

As described above, the two pressurizing chambers of the master cylinder 12 are connected through the respective master-cylinder cut-off valves 94, 95 to the respective front and rear left wheel brake cylinders 20, 22. While the front-brake and rear-brake communication valves 104, 105 as well as the cut-off valves 94, 95 are open, the two front wheel brake cylinders 20, 21 connected to each other by the communication passage 102 are communicated with one of the two pressurizing chambers, while the two rear wheel brake cylinders 22, 23 connected to each other by the communication passage 102 are communicated with the other pressurizing chamber, whereby the four wheel brake cylinders 20–23 can be activated with the pressurized fluid delivered from the master cylinder 12, so that all of the wheel brakes 16–19 can be operated.

The fluid passage 92 for connecting the master cylinder 12 to the rear wheel brake cylinders 22, 23 is connected to a stroke simulator device 130, which includes a stroke simulator 132 and a stroke simulator shut-off valve 134. By energizing and de-energizing a coil 135 of the shut-off valve 134, the stroke simulator 132 is selectively placed in an open state in which the simulator 132 communicates with the master cylinder 12, and a closed state in which the simulator 132 is disconnected from the master cylinder 12. In the present embodiment, the coil 135 of the stroke simulator shut-off valve 134 is held in its de-energized state to hold the stroke simulator 132 in communication with the master cylinder 12, while the wheel brake cylinders 16–19 are operated with the pressurized fluid delivered from the pump device 14. While the wheel brake cylinders 16–19 are operated with the pressurized fluid delivered from the master cylinder 12, the coil 135 is held in its energized state to hold the stroke simulator 132 disconnected from the master cylinder 12. The coil 135 is connected to a driver circuit 136, so that the coil 135 is energized and de-energized to selectively place the stroke simulator shut-off valve in the open and closed states.

There will next be described a control system for the present braking system. In the present embodiment, the linear valve devices 60–63 are controlled by an electronic brake control device 150, which is principally constituted by a computer. As shown in FIG. 2, the electronic brake control device 150 are adapted to receive output signals of the pressure switch 42, an accumulator pressure sensor 158, a brake-pedal stroke sensor 160, two master-cylinder pressure sensors 164, 166, and four wheel-brake pressure sensors 170, 172, 174 and 176. The accumulator pressure sensor 158 is provided to detect the fluid pressure in the fluid passage 26 between the accumulator 40 and the linear valve devices 60–63. The brake-pedal stroke sensor 160 is provided to detect an operating amount of the brake pedal 10. The master-cylinder pressure sensors 164, 166 are provided to detect the fluid pressures in the respective two pressurizing chambers of the master cylinder 12. The wheel-brake pressure sensors 170–176 are provided to detect the fluid pressures in the respective four wheel brake cylinders 20–23. To the brake control device 150, there are also connected: the driver circuit 88 for energizing and de-energizing the coils 76 of the pressure-increasing linear solenoid valves 50–53 and the pressure-reducing linear solenoid valves 56–59; the driver circuits 98, 99 for energizing and de-energizing the coils 96, 97 of the master-cylinder cut-off valves 94, 95; the driver circuits 108, 109 for energizing and de-energizing the coils 106, 107 of the front-brake and rear-brake communication valves 104, 105; and the driver circuit 136 for energizing and de-energizing the coil 1335 of the stroke simulator shut-off valve 134. A hydraulic pressure control unit 180 (FIG. 1) is constituted by the pressure switch 42, the pressure sensors 158, 164, 166, 170–176, the brake-pedal stroke sensor 160, the linear solenoid valves 50–53, 56–59, the cut-off valves 94, 95, the communication valves 104, 105 and the shut-off valve 134. Signal lines L connected to the hydraulic pressure control unit 180 are connected to the brake control device 150 through a connector 182.

To the brake control device 150, there are further connected through a connector 187 an emergency stop indicator in the form of a hazard lamp 184, and an alarm indicator 186 adapted to provide an alarm to the vehicle operator. A signal line L' for applying a control signal to a driver circuit 188 is connected to the brake control device 150 through a connector 190.

To the input of the brake control unit 150, there are further connected a steering angle sensor 216, a yaw rate sensor 218, a lateral acceleration sensor 220, a vehicle speed sensor 222, a manually operated alarm releasing member 223, and two cameras 224. The steering angle sensor 216 is provided to detect an angular position of a steering wheel of the vehicle which is rotatable by the vehicle operator. The wheel speed sensor 222 is provided to detect a running speed of the vehicle. The yaw rate sensor 218 is provided to detect an actual yaw rate of the vehicle, and the lateral acceleration sensor 220 is provided to an actual acceleration G of the vehicle in the lateral or transverse direction of the vehicle (perpendicular to the longitudinal or running direction of the vehicle). The function of the alarm releasing member 223 will be described later. The two cameras 224 are disposed at a front part of the vehicle body, at a height of 125 mm from the ground level, and at a depression angle of 6° with respect to the horizontal plane. For instance, the cameras 224 are disposed at the position of a room mirror provided within the vehicle-operator's compartment of the vehicle. The cameras 224 are adapted to continuously obtain image data representative of scenes in front of the vehicle as viewed in the vehicle running direction. The obtained image data are processed by an image data processing device 226, output signals of which are supplied to the brake control device 150.

The computer of the brake control device 150 includes a read-only memory (ROM) which stores various control programs such as vehicle turning stability control programs (VSC programs) for executing a spinning preventive control and a drift-out preventive control, on the basis of a vehicle running condition estimated on the basis of the output signals of the steering angle sensor 216, yaw rate sensor 218, lateral acceleration sensor 220, vehicle speed sensor 222 and cameras 224. The spinning preventive control and the drift-out preventive control are implemented while the vehicle is turning along a curve. Described more specification, the spinning preventive control is formulated to apply a controlled fluid pressure to the wheel brake cylinder 20, 21 for the front drive wheel FL, FR which is on the outer side of the curve (curved running path), so as to prevent or reduce a spinning tendency of the vehicle. On the other hand, the drift-out preventive control is formulated to apply a controlled fluid pressure to the wheel brake cylinders 20, 21 for the two front drive wheels FL, FR and to the wheel brake cylinder 22, 23 for the rear non-drive wheel RL, RR which is on the inner side of the curve.

The ROM of the computer further stores a control program for executing a hazard preventing control routine which is formulated to activate the alarm indicator 186 or control the fluid pressures in the wheel brake cylinders 20–23 in a manner different from that in the vehicle turning stability controls (VSC controls) such as the spinning and drift-out preventive controls, when the computer determines that it is impossible to prevent a hazardous running or turning state of the vehicle.

The image data processing device 226 includes an obstacle detecting portion for detecting an obstacle in front of the vehicle, and a lane detecting portion for detecting a traffic lane on which the vehicle is running. On the basis of original image data obtained by the cameras 224, the obstacle detecting portion detects the obstacle lying in front of the vehicle, and the lane detecting portion detects the lane of the vehicle by detecting lane-defining white lines which define the lane on which the vehicle is running.

Figure 3A:
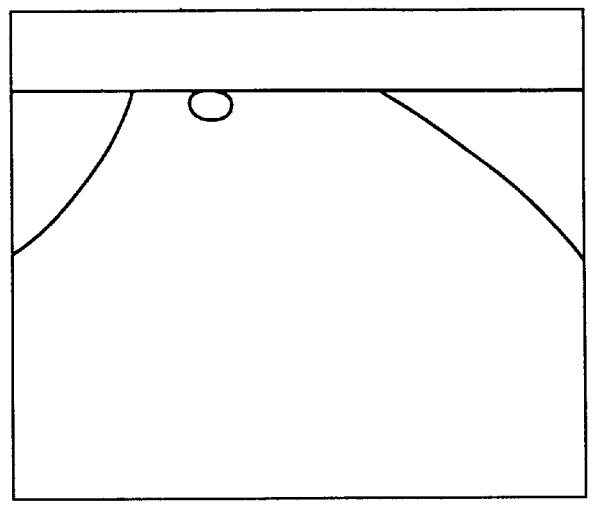
FIGS. 3A–3C are graphs illustrating examples of images obtained by a camera of the vehicle running stability control apparatus.
Figure 3B:
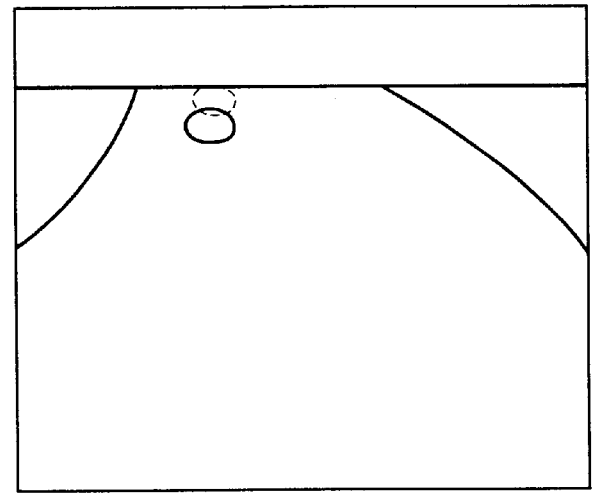
Figure 3C:
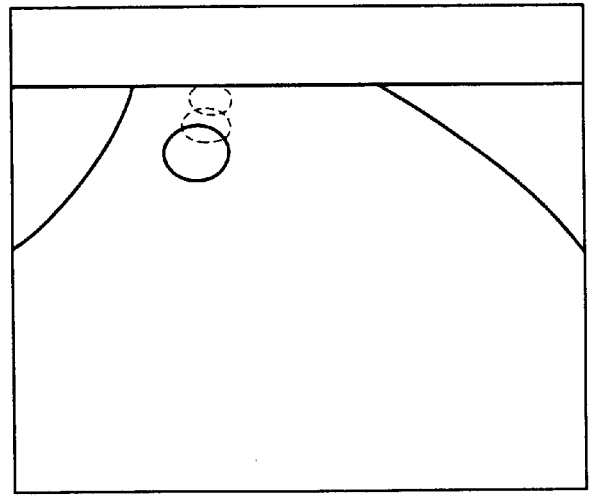

One form of the obstacle detecting portion of the image data processing device 226 will be explained. This obstacle detecting portion detects an obstacle on the basis of image data obtained by the cameras 224, As shown in FIGS. 3A, 3B and 3C, image data sets are obtained by the cameras 224 at a predetermined time interval. In FIG. 3B, an image represented by the image data set obtained in the present control cycle is indicated by a solid line. To detect an obstacle, the currently obtained image data set is compared with an image data set obtained in the last control cycle, which is indicated by a broken line in FIG. 3A. For each obtained data set, a body or object existing on the roadway surface is detected based on a difference in brightness or luminance between the object and the roadway surface. Described more particularly, an image consists of a multiplicity of picture elements. Of all the picture elements, those picture elements whose brightness is different from that of the roadway surface are extracted. Then, a boundary line between the roadway surface and each region defined by the extracted picture elements is determined. Each boundary line thus determined is considered to represent a profile, outline or contour of a certain object. However, objects whose profiles have surface areas smaller than a predetermined lower limit are ignored. Then, the image data set obtained in the last control cycle and the image data set obtained in the present control cycle are compared with each other to determine whether an object represented by the last image data set overlaps an object represented by the present image data set. If these two objects have an overlapping portion with an overlapping ratio larger than a predetermined threshold, these two objects are considered to be the same body. In the examples of FIGS. 3B and 3C showing considerably high ratios of overlapping of the two or three objects represented by the image data sets, these objects are considered to be the same body. The direction and speed of a relative movement of the vehicle and the detected body are calculated on the basis of changes in the positions and surface areas of the overlapping objects represented by the obtained image data sets, and on the basis of the detected running direction and speed of the vehicle. The body which approaches the vehicle at a speed higher than a predetermined upper limit is considered to be an obstacle. The output of the obstacle detecting portion of the image data processing device 226 is fed to the brake control device 150.

Alternatively, the obstacle detecting portion may be arranged as described above. Namely, this obstacle detecting portion includes a random-access memory (RAM) for temporarily storing data, a read-only memory (ROM) storing an intermediate data processing program and an obstacle detecting program, and a central processing unit (CPU) adapted to execute an intermediate data processing and an obstacle detecting algorithm. The RAM is used to temporarily store segment data indicative of a plurality of segments of an image in a monitoring area represented by a selected portion of the image data set obtained by the cameras 224. The RAM is also used to store selected-segment data indicative of those segments which are selected from the above-indicated plurality of segments by an intermediate data processing operation.

This alternative obstacle detecting portion is arranged to minimize the number of the picture elements of the image data, in order to minimize the amount of image data to be handled, and is further arranged to minimize the number of gradation steps represented by the image data, in order to simplify the image. It is desired to determine the number of the gradation steps available such that each object is represented with the same gradation (in a certain gradation step), and such that another object surrounding the above-indicated object is represented with a different gradation (in another gradation step). For example, it is preferred to represent images in eight gradation steps.

Another feature of the present obstacle detecting portion is the use of a selected portion of the image data obtained by the cameras 224, which portion represents the monitoring area in which there exists a body (i.e., obstacle) which has a risk of a collision with the vehicle. The above-indicated selected portion of the image data is used as the segment data indicative of the segments of the monitoring area. Further, the segment data are subjected to the intermediate data processing, for each segment of the monitoring area, to compare the image in each segment obtained in the present control cycle with that obtained in the last control cycle, for selecting the selected-segment data indicative of the presently obtained segments which considerably changed from the previously obtained segments. The thus obtained selected-segment data whose volume is considerably small are subjected to a further analysis in an efficient manner. Accordingly, the present obstacle detecting portion requires a smaller amount of image data to be handled, than the obstacle detecting portion described above.

The present obstacle detecting portion will be more specifically described. First, the obstacle detecting portion selects a portion of the obtained image data, which portion represents the monitoring area, and divides the monitoring portion into a plurality of segments of the same size. The image data representative of each segment are stored in the RAM. Subsequently, the control flow goes to the intermediate data processing in which a sum of the gradation values of the picture elements in each segment is calculated for the two monitoring areas selected in the present and last control cycles, and the sums of the gradation values in the corresponding segments of the two monitoring areas are compared with each other. Since a most of the monitoring area is occupied by the roadway surface, the gradation sums of the picture elements in the corresponding segments of the presently selected monitoring area remains almost unchanged with respect to those of the last selected monitoring area, even if the roadway surface is moved relative to the monitoring area. In the case where the sum of the gradation values of a given segment (presently obtained segment) in the presently selected monitoring area considerably change with respect to that of the corresponding segment (last obtained corresponding segment) in the last selected monitoring area, it is considered that an object which has not existed in the last obtained corresponding segment, or a portion of the presently detected object which has not existed in the last obtained segment has appeared for the first time in the presently obtained segment, or the object which has existed in the last obtained segment has disappeared from the presently obtained corresponding segment. In view of this, the presently obtained segment whose amount of change or difference of the gradation sum from that of the last obtained segment is smaller than a predetermined value, that segment in the presently obtained monitoring area is not selected in the present control cycle. If the amount of change or difference of the gradation sum of the presently obtained segment from that of the last obtained corresponding segment is larger than the predetermined value, that presently obtained segment is stored in the RAM as selected-segment data, and is subjected to a further processing operation which will be described. The predetermined value of the amount of change of the gradation sum may be a predetermined threshold value of the amount of change of the gradation sum, or may be represented by a predetermined threshold ratio of the amount of change of the gradation sum of the presently obtained segment to the gradation sum of the last obtained segment.

A difference of the gradation value of each picture elements in the thus selected segment represented by the stored selected-segment data from that of each picture element in the last obtained corresponding segment is calculated. Since successive image data sets are obtained at a relatively short time interval, the above-indicated difference of the presently and last obtained segments is not so large. Accordingly, the amount of change of the gradation value between the segments of the successively obtained image data sets is almost zero for most of the picture elements. However, the amounts of change of the gradation values of the picture elements defining the boundary between an object and the background (roadway surface) and the amount of change of the gradation values of the picture elements adjacent to those picture elements are distinctively large due to a movement of the object relative to the vehicle. Thus, the picture elements whose gradation values have considerably changed can be considered to define an object whose boundary with respect to the background has moved. Based on the calculated values of difference of the corresponding picture elements in the last and presently obtained image data sets, the profile or outer contour of the object existing on the roadway surface is determined. Described in detail, all of the selected segments represented by the stored selected-segment data are replaced in the original positions in the monitoring area, and are analyzed to determine whether the picture elements of those selected segments whose gradation values are larger than a predetermined lower limit cooperate to define an enclosed region, and whether those picture elements cooperate with a lane-defining line on the roadway surface to define an enclosed region. If any enclosed region is defined totally or partially by the picture elements, that enclosed region is recognized as an object existing on the roadway surface. If the ratio of overlapping of the objects represented by the last and presently obtained image data sets is higher than a predetermined threshold, or the profiles of these two objects are similar to each other, these two objects are considered to be the same body. Then, the surface areas of the two objects are compared with each other to determine whether the body in question is an obstacle to the vehicle. Namely, if the vehicle approaches a body on the road surface within a relatively short distance from the vehicle, the surface area of the body represented by the presently obtained image data set increases by a relatively large amount with respect to that of the body represented by the last obtained image data set. Based on this fact, the body in question is recognized as an obstacle, if the ratio of the surface area of the body represented by the presently obtained image data set to that of the body represented by the last obtained image data set is larger than a predetermined threshold. Even if the body represented by the presently obtained image data set is relatively large, the ratio of increase of the surface area of the body is relatively large when the distance between the vehicle and the body is relatively long. In this case, the body is not recognized as an obstacle to the vehicle. Even if the body is not so large, on the other hand, the ratio of increase of the surface area of the body is relatively large when the distance is relatively short. In this case, the body is recognized or detected as an obstacle to the vehicle, unless the body is negligibly small. Information as to whether an obstacle is detected or not is supplied to the brake control device 150.

The obstacle detecting portion of the image data processing device 226 may use a radar to detect a distance between the obstacle and the vehicle and a relative speed or acceleration of the obstacle and the vehicle, when the obstacle is detected by the cameras 224, as existing on the roadway lane on which the vehicle is running, and in the running path along which the vehicle is expected to run. It is also noted that a radar can be used to determine whether an obstacle exists in the running path along which the vehicle is expected to run.

There will next be described the lane detecting portion of the image data processing device 226. The traffic lane on which the vehicle is running is detected also on the basis of image data obtained by the cameras 224. The lane on the roadway is detected by processing original image data obtained by the cameras 224, as indicated in FIGS. 4A–4E. This detection relies on a fact that the luminance of white lines on the roadway surface which define a traffic lane is sufficiently higher than that of the other area of the scene taken by the cameras 224. That is, the picture elements whose luminance is higher than a predetermined threshold are selected. The selected picture elements can be considered to define the white lines on the roadway surface under certain conditions.

Figure 4A:
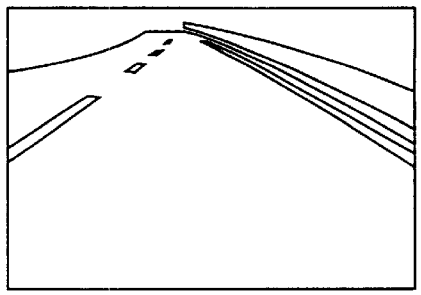
FIGS. 4A–4E are graphs illustrating a procedure implemented by the vehicle stability control apparatus for detecting lane-defining white lines on a roadway.
Figure 4C:
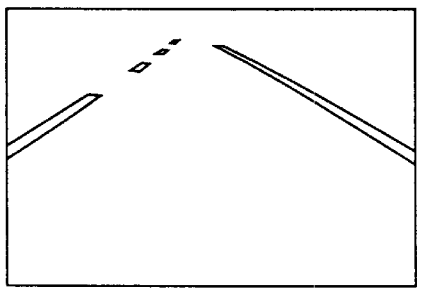
Figure 4B:
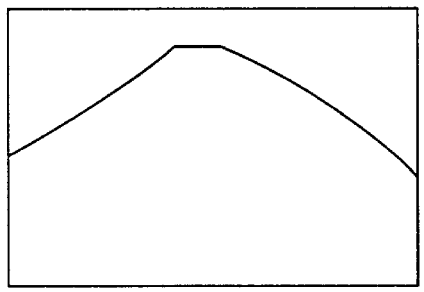
Figure 4D:
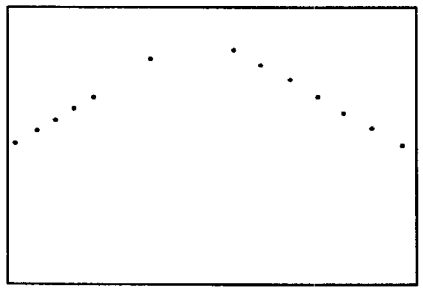
Figure 4E:
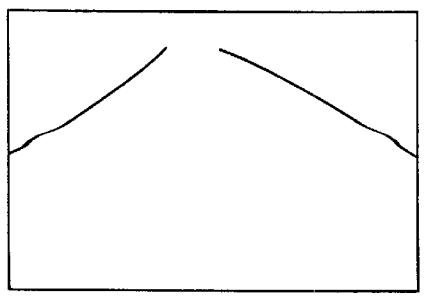
Figures 5, 6:
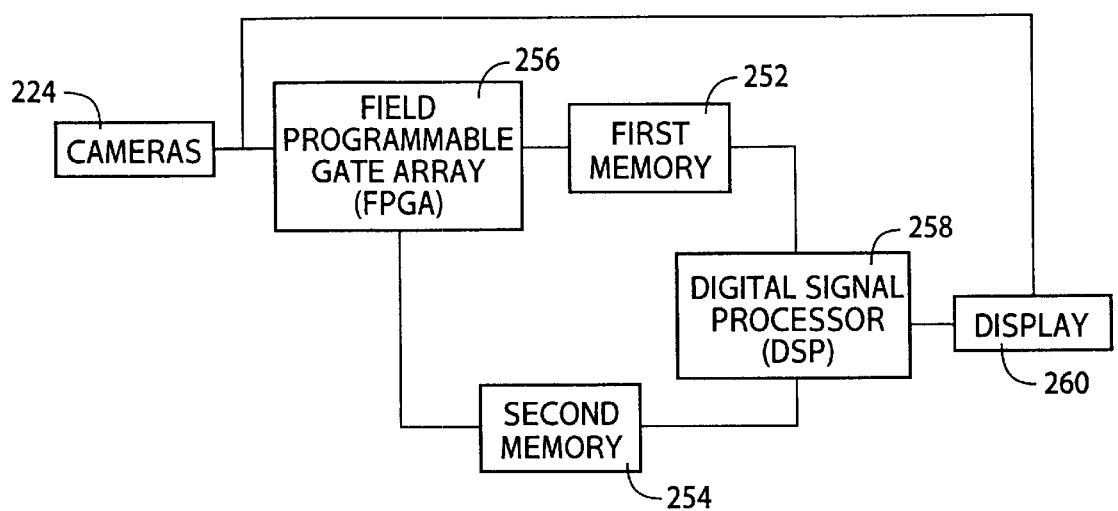
FIG. 5 is a block diagram illustrating an image data processing device incorporated in the vehicle stability control apparatus to detect the lane-defining white lines.

The lane detecting portion may use a roadway white line sensor as disclosed in Matsushita Technical Journal, Vol. 44, No. 33, po. 75–79. This roadway white line sensor uses a hardware arrangement as shown in FIG. 5, for processing image data obtained by the cameras 224, to detect the white lines on the roadway surface. The hardware arrangement includes a first memory 252, a second memory 254, a field programmable gate array (FPGA) 256 adapted to execute a white line detecting algorithm, a digital signal processor (DSP) 258, and a display 260 adapted to display an image represented by image data obtained by the cameras 224, and results of image data processing by the FPGA 256 and DSP 258. The first memory 252 stores image data having a relatively low spatial frequency, while the second memory 254 stores image data having a relatively high spatial frequency. The image data processing is effected in the following manner. The original non-processed image data as obtained by the cameras 224, which are indicated in FIG. 4A, are fed to the FPGA 256 for classification into the image data having a relatively low spatial frequency to be stored in the first memory 252, and the image data having a relatively high spatial frequency to be stored in the second memory 254. A lane area is defined as indicated in FIG. 4B, on the basis of the image data having a relatively low spatial frequency, while only the edges of the white lines (white strips) on the roadway surface are defined as indicated in FIG. 4C, using edge extracting filters as shown in FIG. 6A and 6B, and on the basis of the image data having a relatively high spatial frequency. The two edge filters shown in FIGS. 6A and 6B are used for processing the respective image data portions corresponding to the right and left parts of the scene represented by the entire image data. On the basis of the thus obtained lane area and edges of the white lines, the white lines on the roadway surface are detected as indicated in FIGS. 4D and 4E. By using both the image data having a relatively low spatial frequency and the image data having a relatively high spatial frequency, the lane on which the vehicle is running can be detected with high accuracy, even if the white lines are partially obscured or discontinuous with separations.

There will be described an operation of the braking system constructed as described above.

First, the vehicle running stability control (abbreviated as "VSC control") will be explained. The ROM of the computer of the brake control device 150 stores vehicle turning stability control programs such as a spinning preventive control program and a drift-out preventive control program, as disclosed in JP-A-9-221015. Described briefly, the spinning preventive control is effected according to the spinning preventive control program, when the vehicle is considered to have an excessively spinning tendency during turning along a curve. The spinning tendency is caused by a so-called "oversteering" of the vehicle. When the vehicle is considered to have an excessive drift-out tendency, the drift-out preventive control is effected according to the drift-out preventive control program. The excessive drift-out tendency is caused by a so-called "understeering" of the vehicle.

When it is determined that the vehicle has an excessively spinning tendency during turning of the vehicle, the spinning preventive control is effected to increase the fluid pressure in the wheel brake cylinder 20 or 21 of one of the front drive wheels FL, FR which is located on the outer side of the curved turning path of the vehicle. To this end, the master-cylinder cut-off valves 94, 95 are closed, and the pressurized fluid delivered from the pump device 14 is supplied to the wheel brake cylinder 20 or 21 of the above-indicated one of the front drive wheels.

Where the front right wheel FR is on the outer side of the turning path of the vehicle, the front right wheel brake cylinder 21 is activated to brake the front right wheel FR, for thereby restricting or reducing the spinning tendency of the vehicle. At this time, the fluid pressures in the rear wheel brake cylinders 22, 23 are not controlled.

When it is determined that the vehicle has an excessive drift-out tendency, the drift-out preventive control is effected to increase the fluid pressures in the wheel brake cylinders 20, 21 of the front drive wheels FL, FR and the fluid pressure in the wheel brake cylinder 22 or 23 of one of the rear driven wheels RL, RR which is located on the inner side of the curved turning path of the vehicle. In this case, too, the master-cylinder cut-off valves 94, 95 are closed, and the pressurized fluid delivered from the pump device 14 are supplied to the front wheel brake cylinders 20, 21 and the rear wheel brake cylinder 22 or 23 of the above-indicated one of the rear wheels RL, RR.

Figure 7:
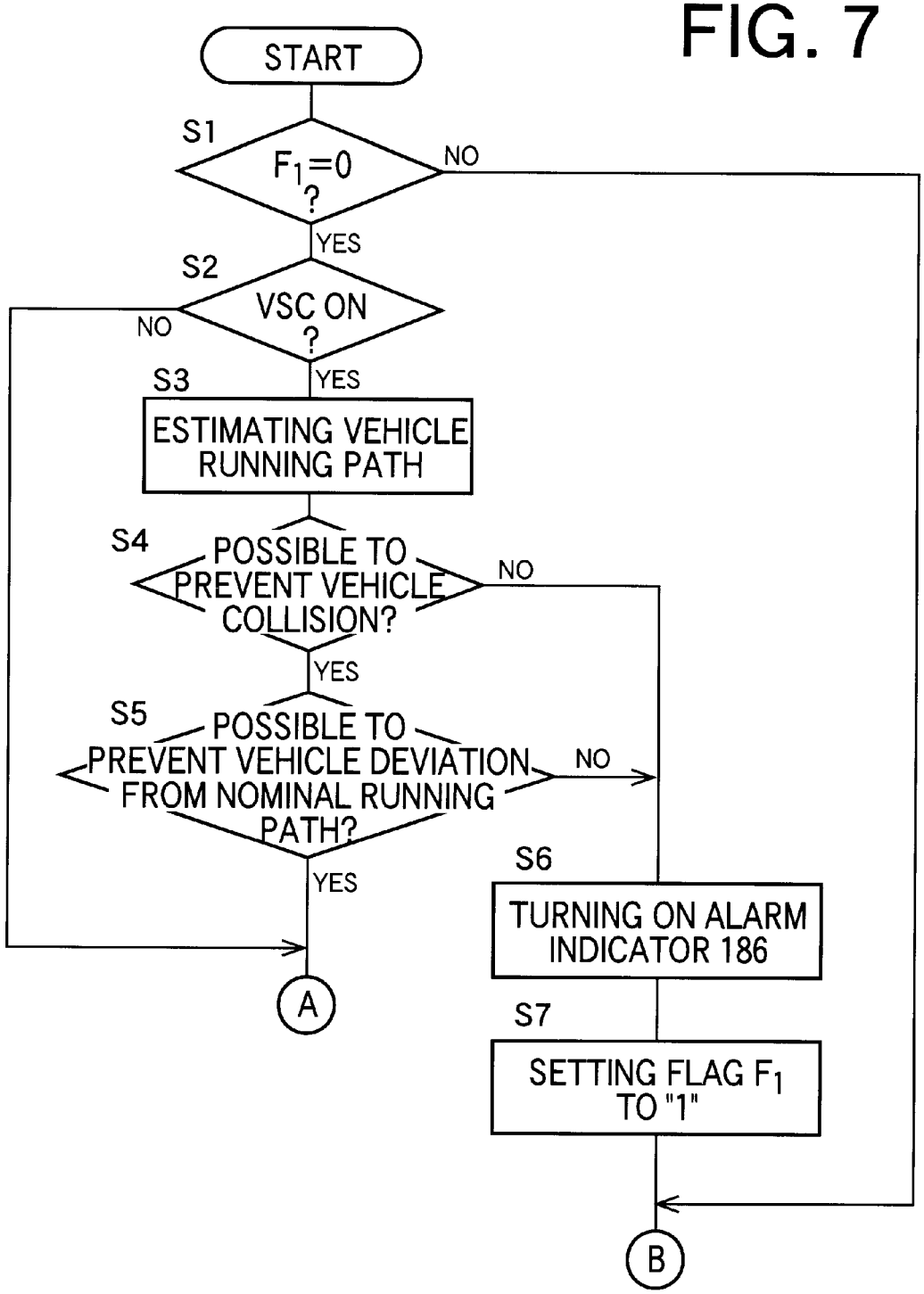
FIG. 7 is a flow chart illustrating a hazard determining portion of a hazard preventing control routine executed by the vehicle running stability control apparatus.
Figure 8:
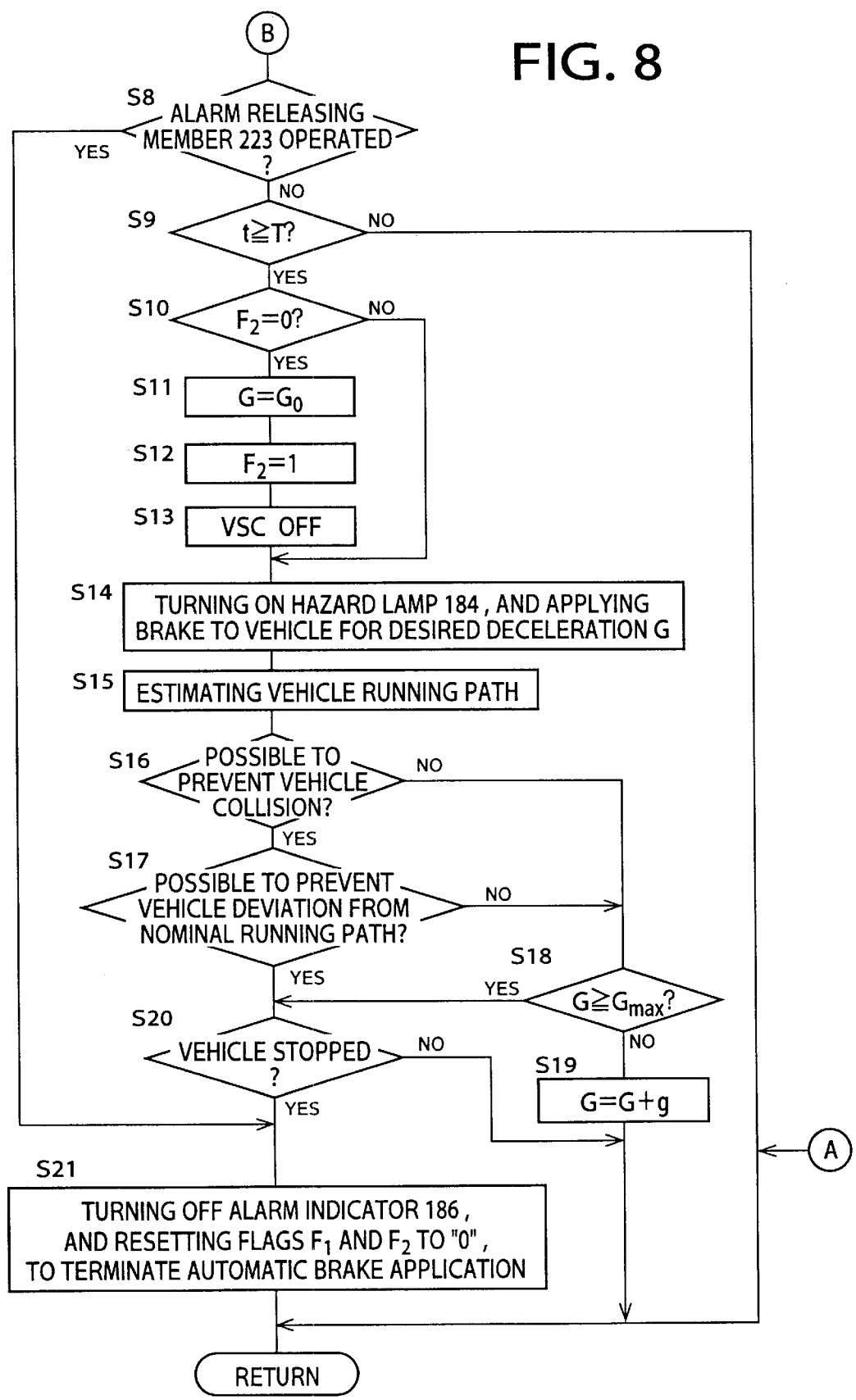
FIG. 8 is a flow chart illustrating an automatic brake application control portion of the hazard preventing control routine.

The ROM of the brake control device 150 further stores a hazard preventing control program for executing a hazard preventing control routine illustrated in the flow chart of FIGS. 7 and 8. This hazard preventing control routine is repeatedly executed during running of the vehicle, to monitor the vehicle running condition while the vehicle turning stability control is effected. This monitoring is initiated upon initiation of the spinning preventive control or the drift-out preventive control. Described more specifically, the running path, more precisely, the turning path of the vehicle is estimated on the basis of the output signals of the steering angle sensor 216, yaw rate sensor 218, lateral acceleration sensor 220 and vehicle speed sensor 222. The hazard preventing control routine is further formulated to determine whether the currently effected vehicle turning stability control (spinning or drift-out preventive control) permits the vehicle to be adequately controlled so as to prevent a hazardous condition of the vehicle, namely, a possible deviation of the vehicle from the nominal turning path or from the present lane on the roadway, or a possible collision of the vehicle with an obstacle. If it is determined that the vehicle can be controlled to prevent the hazardous running condition by the vehicle turning stability control, this control is continued. If it is determined that the vehicle turning stability control does not permit the vehicle to be controlled so as to prevent the hazardous condition, the vehicle is automatically braked to secure a safe state of the vehicle.

The hazard preventing control routine will be described by reference to the flow charts of FIGS. 7 and 8. The hazard preventing control routine is initiated with step S1 to determine whether a HAZARD flag F1 is set to "0". When this flag F1 is set at "1", it means that a decision that it is impossible to prevent a hazardous condition of the vehicle has been made. When the flag F1 is set at "0", it means that the decision has not been made. The HAZARD flag F1 is reset to "0" when the brake control device 150 is turned on. If the flag F1 is set at "1", a negative decision (NO) is obtained in step S1 (FIG. 7), and the control flow goes to step S8 (FIG. 8). Steps S1–S7 of the flow chart of FIG. 7 corresponds to a hazard determining portion of the brake control device 150, while steps S8–S21 corresponds to an automatic brake application control portion of the brake control device 150.

Figure 9:
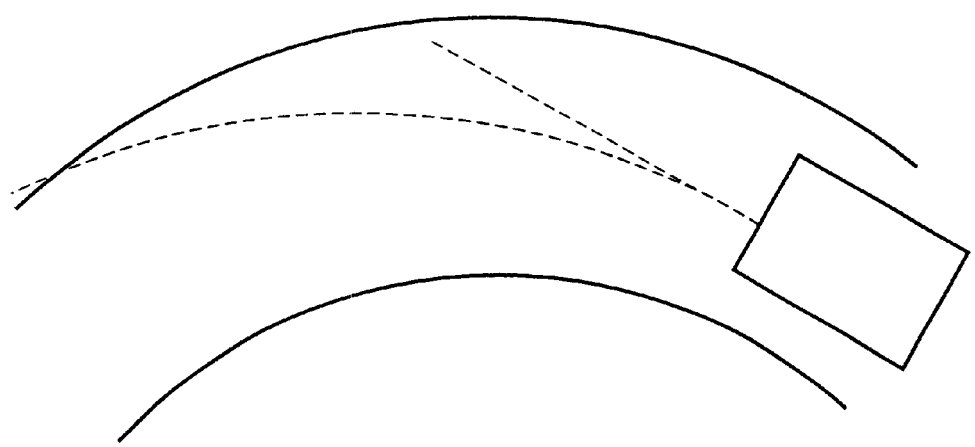
FIG. 9 is a graph for explaining estimation of a running path of the vehicle by the vehicle running stability control apparatus.

If the flag F1 is set at "0", an affirmative decision (YES) is obtained in step S1, and the control flow goes to step S2 to determine whether the vehicle turning stability control is presently effected according to the spinning preventive control program or the drift-out preventive control program. If a negative decision (NO) is obtained in step S2, one cycle of execution of the present hazard preventing control routine of FIGS. 7 and 8 is terminated. If an affirmative decision (YES) is obtained in step S2, that is, if the vehicle turning stability control is being effected, the control flow goes to step S3 to estimate the turning path of the vehicle, as indicated by broken lines in FIG. 9. Step S3 is followed by step S4 to determine whether the vehicle turning stability control permits the vehicle to be controlled so as to prevent a collision of the vehicle with an obstacle. This determination is made based on the estimated turning path of the vehicle and the output signals of the image data processing device 226 which has been described above in detail. For instance, the determination in step S4 is effected by determining whether an obstacle exists on the estimated turning path of the vehicle and within a predetermined distance from the vehicle, which distance is determined by the detected vehicle running speed.

Figure 10:
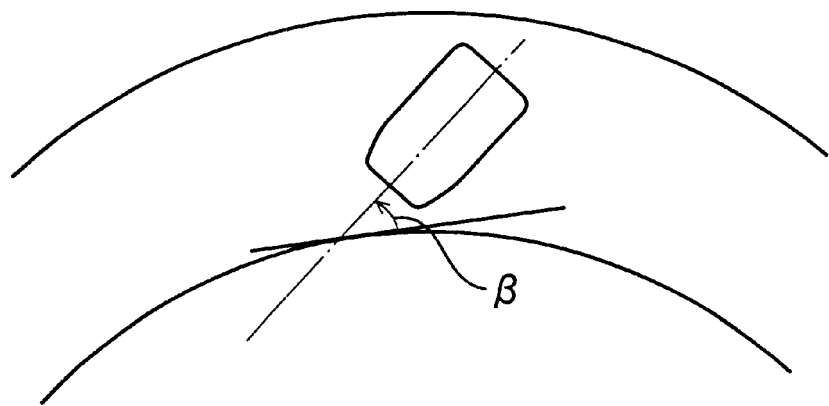
FIG. 10 is a view indicating an angle between the longitudinal direction of the vehicle and a line tangent to the inner lane-defining white line on the roadway.

If an affirmative decision (YES) is obtained in step S4, the control flow goes to step S5 to determine whether the vehicle turning stability control permits the vehicle to be controlled so as to prevent a deviation of the vehicle from the nominal turning path. This determination is made on the basis of an angle $\beta$ and an angular velocity $\beta'$. As indicated in the graph of FIG. 10, the angle $\beta$ is an angle between the longitudinal direction of the vehicle and a straight line tangent to one of the two lane-defining white lines detected by processing of the image data by the image data processing device 226. If at least one of the angle $\beta$ and the angular velocity $\beta'$ is larger than a predetermined threshold, it is determined that the vehicle turning stability control does not permit the vehicle to be controlled so as to prevent the vehicle deviation from the nominal turning path. To effect this determination, a first threshold $\beta1$ and a second $\beta2$ are used for the angle $\beta$, and a first threshold $\beta'1$ and a second threshold $\beta'2$ are used for the angular velocity $\beta'$. One example of the manner in which the determination is effected is illustrated in the table of FIG. 11, wherein "X" represents a negative decision (NO) in step S5 that it is not possible to prevent the vehicle deviation, while "○" represents an affirmative decision (YES) in step S5 that it is possible to prevent the vehicle deviation. Namely, the negative decision (NO) is obtained in step S5 if the angle $\beta$ and the angular velocity $\beta'$ are both larger than the respective first thresholds $\beta1$ and $\beta'1$, or if one of the angle $\beta$ and the angular velocity $\beta'$ is larger than the first threshold $\beta1$ or $\beta'1$ while the other of the angle $\beta$ and the angular velocity $\beta'$ is larger than the second threshold $\beta2$ or $\beta'2$.

If the presently effected vehicle turning stability control permits the vehicle to be controlled so as to prevent a collision of the vehicle with an obstacle and a deviation of the vehicle from the nominal turning path, that is, if an affirmative decision (YES) is obtained in steps S4 and S5, one cycle of execution of the hazard preventing control routine is terminated. If it is impossible to prevent a collision of the vehicle with an obstacle and/or a deviation of the vehicle from the nominal turning path, that is, if a negative decision (NO) is obtained in at least one of steps S4 and S5, the control flow goes to step S6 to activate the alarm indicator 186 to provide an alarm that the vehicle turning stability control does not permit the vehicle to be controlled in an adequate manner. The alarm indicator 186 may be adapted to provide an audible alarm such as a sound or voice message, an optical alarm such as illumination of a light, or a vibrational alarm such as vibration of a suitable member such as the steering wheel which is normally held in contact with the vehicle operator's hand or hands or other parts of the body. The alarm indicator 186 may provide a combination of two or more different kinds of alarm. Step S6 is followed by step S7 in which the HAZARD flag F1 is set to "1". The operation of the hazard determining portion of the brake control device 150 is terminated with step S7. Then, the control flow goes to step S8 of the flow chart of FIG. 8, which is the first step executed by the automatic brake application control portion of the brake control device 150.

Step S8 is provided to determine whether the alarm releasing member 223 has been operated by the vehicle operator who does not want brake application to the vehicle under the automatic brake application control which has initiated in response to detection of a possible hazardous running condition of the vehicle in steps S4–S6. The alarm releasing member 223 (FIG. 2) may be an operator-controlled member exclusively provided for de-energizing the alarm indicator 186, or an accelerator pedal an operation of which indicates that the vehicle operator does not wish to apply a brake to the vehicle under the automatic brake application control by the automatic brake application control portion corresponding to the following steps S9–S20 which will be described.

If the vehicle operator has operated the alarm releasing member 223 (the accelerator pedal), an affirmative decision (YES) is obtained in step S8, and the control flow goes to step S21 to turn off the alarm indicator 186 and reset the flag F1 and a flag F2 to terminate the automatic brake application control. Then, the control flow goes back to step S1 to initiate the next cycle of execution of the hazard preventing control routine. If the alarm releasing member 223 has not been operated, a negative decision (NO) is obtained in step S8, and the control flow goes to step S9 to determine whether a time t which has passed after the activation of the alarm indicator 186 is equal to or longer than a predetermined time T. If a negative decision (NO) is obtained in step S9, the control flow goes back to step S1, that is, the control flow does not go to step S10 and the subsequent steps t initiate the automatic brake application control. In this respect, it is noted that the vehicle operator may elect to manipulate the vehicle after the alarm indicator 186 is activated. Usually, a certain length of time is required after the alarm indicator 186 is activated and before the vehicle operator initiates a manipulation of the vehicle in an effort to prevent a hazardous running condition of the vehicle which has been recognized by the vehicle operator upon activation of the alarm indicator 186. If the automatic brake application control were initiated immediately after the activation of the alarm indicator 186, the automatic brake application would be initiated contrary to the vehicle operator's intention to manipulate the vehicle or purposely change the traffic lane from the present lane to the adjacent lane. Therefore, it is not desirable to initiate the automatic brake application control immediately after the activation of the alarm indicator 186 (immediately after the detection of a possible hazardous condition of the vehicle). To prevent the initiation of the automatic brake application control for a predetermined time after the activation of the alarm indicator 186, step S9 is provided to permit the vehicle operator to have a time for determining as to whether the vehicle should be manipulated by the vehicle operator, rather than the automatic brake application control is implemented.

Before the predetermined time T has passed after the moment of activation of the alarm indicator 186, that is, if a negative decision (NO) is obtained in step S9, the control flow goes back to step S1 to initiate the next cycle of execution of the hazard preventing control routine. In this cycle wherein the HAZARD flag F1 has been set to "1", the negative decision (NO) is obtained in step S1, and the control flow goes to steps S8 and S9 while skipping steps S2–S7. If the alarm releasing member 223 is operated while steps S8 and S9 are repeatedly implemented, the control flow goes to step S21 to turn off the alarm indicator 186.

If the alarm releasing member 223 is not operated until the predetermined time T has passed after the activation of the alarm indicator 186, an affirmative decision (YES) is obtained in step S9, and the control flow goes to step S10 to determine whether a BRAKE APPLICATION START flag F2 is set at "0". When this flag F2 is set at "0", it means that the automatic brake application has not been initiated. When the flag F2 is set at "1", it means that the automatic brake application has already been initiated. If the automatic brake application has been initiated, that is, if a negative decision (NO) is obtained in step S10, the control flow goes to step S14 while skipping steps S11–S13. In step S14, the hazard lamp 184 is kept on to inform the operators of vehicles following the vehicle in question, that the vehicle in question will be stopped by brake application. Further, the automatic brake application is continued in step S14. If the flag F2 is set at "0", an affirmative decision (YES) is obtained in step S10, and the control flow goes to step S11 to set a desired deceleration value G of the vehicle to be equal to an initial deceleration value $G_0$. Then, step S12 is implemented to set the flag F2 to "1". Step S12 is followed by step S13 to terminate the vehicle turning stability control. Step S13 is followed by step S14 to apply a brake to the vehicle so that the actual deceleration value of the vehicle is made equal to the determined desired value G.

Described more specifically, the automatic brake application in step S14 is effected such that the fluid pressures in the wheel brake cylinders 20–23 for all of the four wheels FL, FR, RL, RR are increased to a level not lower than a level corresponding to the desired vehicle deceleration value G, while the master-cylinder cut-off valves 94, 95 are held closed. Since the vehicle turning stability control (spinning or drift-out preventive control) has been implemented before the initiation of the automatic brake application, the fluid pressure in at least one of the wheel brake cylinders 20–23 is higher than the atmospheric pressure, and may be larger than the level corresponding to the desired vehicle deceleration value G. The wheel brake cylinder pressure higher than the level corresponding to the desired vehicle deceleration value G is maintained at the present level, during the automatic brake application. In other words, the fluid pressures in the selected one of the four wheel brake cylinders 20–23 which pressure are lower than the level corresponding to the desired vehicle deceleration value G are increased to that level in step S14.

Step S14 is followed by step S15 to estimate the vehicle running path when the vehicle is decelerated at the desired deceleration value G. Step S15 is followed by steps S16 and 17 to determine whether it is possible to prevent a collision of the vehicle with an obstacle and a deviation of the vehicle from the nominal running path. If an affirmative decision (YES) is obtained in both steps S16 and S17, the control flow goes to step S20. If a negative decision (NO) is obtained in step S16 and/or step S17, that is, if it is impossible to prevent the vehicle collision with the obstacle and/or the vehicle deviation from the nominal running path, the control flow goes to step S18 to determine whether the present desired deceleration value G (positive value) of the vehicle is equal to or larger a maximum value Gmax. If the present desired deceleration value G is smaller the maximum value Gmax, the control flow goes to step S19 to increment the desired deceleration value G by a predetermined value g. If the present desired deceleration value G is equal to or larger the maximum value Gmax, an affirmative decision (YES) is obtained in step S18, and the control flow goes to step S20 to determine whether the vehicle has been brought to a stop. If a negative decision (NO) is obtained in step S20, one cycle of execution of the present control routine is terminated, and the control flow goes back to step S1. If an affirmative decision (YES) is obtained in step S20, the control flow goes to step S21 to turn off the alarm indicator 186 and reset the flags F1 and F2 to "0" to terminate the brake application to the vehicle.

The vehicle stability control apparatus according to the present embodiment is constructed such that the desired deceleration value G of the vehicle during the automatic brake application control is incremented if the automatic brake application to the vehicle so as to achieve the present desired deceleration value G does not make it possible to prevent the hazardous running condition of the vehicle and if the present desired deceleration value G is smaller the maximum value Gmax. Thus, the automatic brake application is continued by incrementing the braking pressure in the wheel brake cylinders 20–23 by a predetermined value corresponding to the increment value g of the desired deceleration value G, to increment the actual vehicle deceleration value. If it is determined that the brake application to the vehicle so as to achieve the present desired deceleration value G makes it possible to prevent the hazardous vehicle condition, or if the present desired deceleration value G has been incremented to the maximum value Gmax, the automatic brake application is continued with the braking pressure corresponding to the maximum desired deceleration value Gmax.

It will be understood from the foregoing description of the present embodiment that the vehicle stability control apparatus controls the vehicle to assure a safe state of the vehicle rather than a stable running or turning of the vehicle, in the case where the vehicle running stability control does not make it possible to prevent a hazardous running condition of the vehicle. The automatic brake application which has been initiated the predetermined time T after the moment of activation of the alarm indicator 186 (after the moment of detection of a hazardous running condition of the vehicle) can be terminated by operating the alarm releasing member 223, so that the vehicle can be manipulated by the vehicle operator so as to prevent the hazardous running condition of the vehicle. It is further noted that the automatic brake application is continued with the initial vehicle deceleration value as long as the hazardous running condition of the vehicle can be prevented with the initial deceleration value. If it is determined that the hazardous running condition of the vehicle cannot be prevented with the continued brake application with the initial deceleration value, the desired deceleration value G is incremented to increment the braking pressure in the wheel brake cylinders 20–23. The automatic brake application is effected for the purpose of securing a safe state of the vehicle. In this sense, the automatic brake application may be initiated with the maximum value Gmax of the desired deceleration value G, so that the vehicle is braked with the maximum braking force with the four wheel brake cylinders 20–23 from the very beginning of the automatic brake application, in order to minimize the running distance of the vehicle required to stop the vehicle.

In the present embodiment, the table of FIG. 11 is used to determine whether the vehicle turning stability control permits the vehicle to be controlled so as to prevent a hazardous running or turning condition of the vehicle. However, the table of FIG. 11 may be replaced by a predetermined inequity which includes the angle $\beta$ and the angular velocity $\beta'$.

The image data processing device 226 and the brake control device 150 may be principally constituted by a single computer.

It will be understood from the foregoing description of the present embodiment that the vehicle stability control apparatus is constituted by the brakes 16–19, brake control device 150, hydraulic pressure control unit 180, hazard lamp 184, alarm indicator 186, steering angle sensor 216, yaw rate sensor 218, lateral deceleration sensor 220, vehicle speed sensor 222, cameras 224 and image data processing device 226. It will also be understood that the cameras 224 and the obstacle detecting portion of the image data processing device 226 cooperate to constitute an obstacle detecting device for detecting an obstacle in front of the vehicle and in the running path of the vehicle, while the cameras 224 and the lane detecting portion of the image data processing device 226 cooperate to constitute a lane detecting device for detecting a lane-defining line which defines a traffic lane on which the vehicle is running. It will further be understood that a portion of the brake control device assigned to implement step S3 constitutes a running path estimating device for estimating the running path of the vehicle, and that a portion of the brake control device assigned to implement step S5 constitutes a vehicle-deviation determining device for determining whether there is a risk of a deviation of the vehicle from the nominal running path. It will also be understood that a portion of the brake control device 150 assigned to implement steps S8–S13 constitute a running stability control terminating device for terminating the vehicle stability control, while a portion of the brake control device 150 assigned to implement steps S14–S21 cooperates with the pump device 14, wheel brakes 16–19 and hydraulic pressure control unit 180 to constitute an automatic brake application device for automatically applying a brake to the vehicle.

A second embodiment of this invention will be described.

A braking system including the vehicle stability control apparatus according to the present second embodiment is almost identical in hardware arrangement with the braking system of FIGS. 1 and 2 including the vehicle stability control apparatus according to the first embodiment of FIGS. 1–11. The vehicle stability control apparatus according to the second embodiment is different in software arrangement from the vehicle stability control apparatus according to the first embodiment. There will be described only a portion of the software arrangement of the present vehicle stability control apparatus of the second embodiment which is different from that of the first embodiment.

In the present second embodiment, a vehicle deviation preventing control for preventing a deviation of the vehicle from the nominal vehicle running path and a vehicle collision preventing control for preventing a collision of the vehicle with an obstacle can be effected independently of each other. One, both or none of these vehicle deviation preventing control and vehicle collision preventing control can be implemented by selectively operating two operator-controlled selector devices in the form of a collision-preventing-control selector switch SW1 and a deviation-preventing-control selector switch SW2. These two operator-controlled selector devices may be replaced by a single operator-controlled selector device. Where the vehicle deviation preventing control and the vehicle collision preventing control are implemented concurrently and in parallel with each other, the automatic brake application is effected according to one of the two controls which requires a larger braking force (to achieve a larger desired deceleration value G) to prevent the hazardous running condition of the vehicle (vehicle deviation or vehicle collision). The brake control device 150 uses a microcomputer which is capable of implementing the two controls concurrently, in a time-sharing manner. Further, the two controls are implemented independently of the vehicle turning stability control such as the spinning preventive control and the drift-out preventive control. When the automatic brake application control is required according to the vehicle deviation preventing control or the vehicle collision preventing control in the process of the vehicle turning stability control, the automatic brake application control is implemented in place of the vehicle turning stability control. In this case, a BRAKE APPLICATION START flag F4 is set to "1" to terminate the vehicle turning stability control. The vehicle deviation preventing control and the vehicle collision preventing control may be implemented under the control of respective different computers.

The vehicle collision preventing control is repeatedly implemented independently of the vehicle turning stability control, while the collision-preventing-control selector switch is held ON. Further, a determination as to whether it is impossible to prevent a vehicle collision with an obstacle is made on the basis of the vehicle running path estimated by the hazard determining portion of the image data processing device 226 on the assumption that the vehicle is decelerated at a predetermined reference deceleration value $G_1$. The present second embodiment is different from the first embodiment in these two aspects. The vehicle collision preventing control and the vehicle deviation preventing control will be described in more detail by reference to the flow charts of FIGS. 12 and 13, which show a vehicle collision preventing control routine and a vehicle deviation preventing control routine, respectively.

Figure 12:
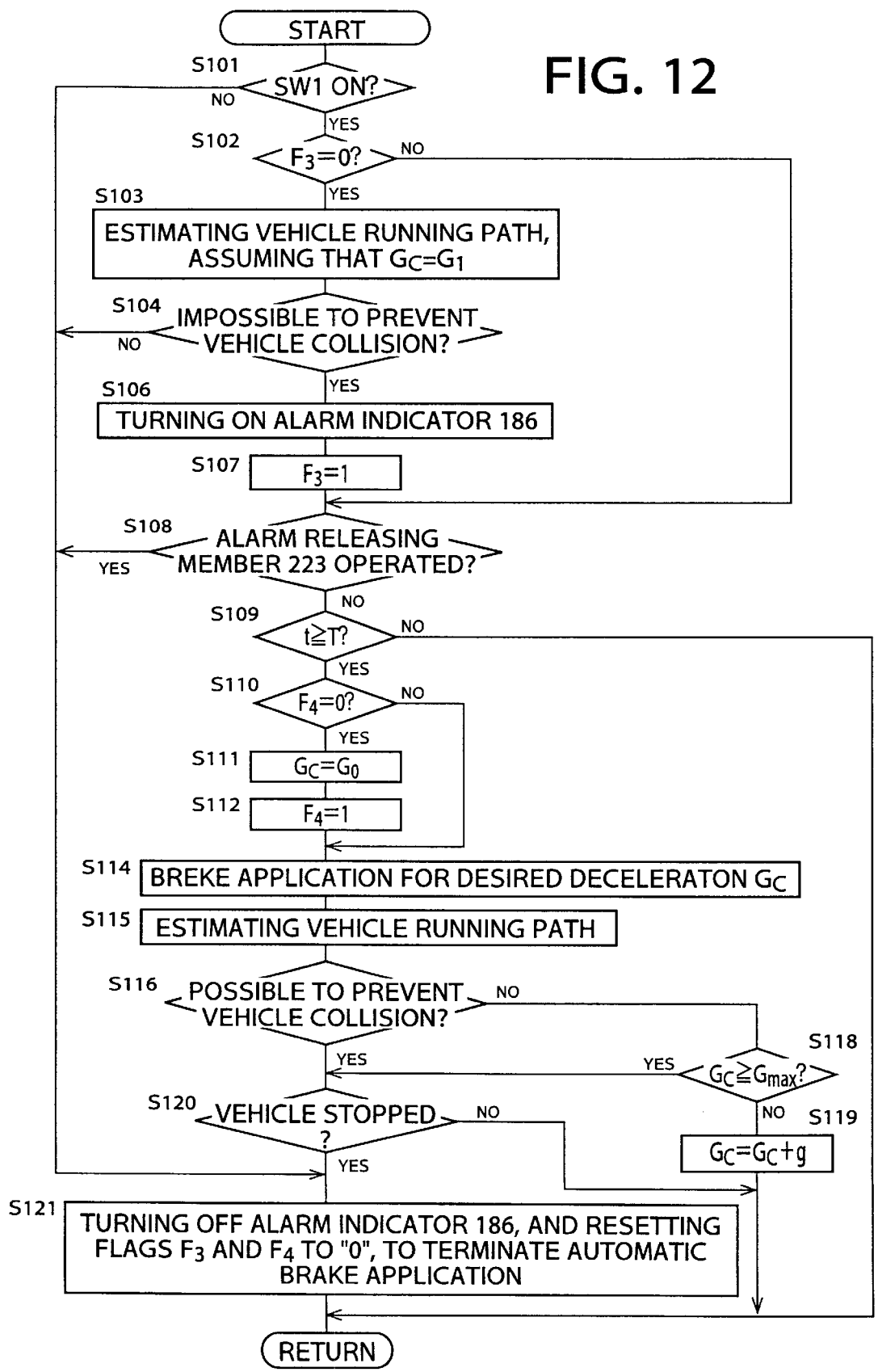
FIG. 12 is a flow chart illustrating a vehicle collision preventing control routine executed according to a second embodiment of this invention, to effect an automatic brake application control for preventing a collision of the vehicle with an obstacle.

The vehicle collision preventing control routine of FIG. 12 is initiated with step S101 to determine whether the collision-preventing-control selectors switch SW1 is in the ON state. If a negative decision (NO) is obtained in step S101, the control flow goes to step S121 to reset flags F3 and F4 to "0" to inhibit the automatic brake application to the vehicle. Thus, one cycle of execution of the routine of FIG. 12 is terminated. If an affirmative decision (YES) is obtained in step S101, the control flow goes to step S102 to determine whether the HAZARD flag F3 is set at "0". This flag F3 is similar to the HAZARD flag F1 in the first embodiment. If an affirmative decision (YES) is obtained in step S102, the control flow goes to step S103 to estimate the vehicle running path on the assumption that the vehicle is decelerated at the reference deceleration value $G_1$. Then, steps S104, S106 and S107 which are similar to steps S4, S6 and S7 of FIG. 7 are implemented to determine whether it is impossible to prevent a collision of the vehicle with an obstacle, and activate the alarm indicator 186 and set the flag F3 to "1", if it is impossible to prevent the vehicle collision with the obstacle. The determination in step S104 is effected on the basis of the estimated vehicle running path. Steps S101–S104 and S106–S107, which correspond to the hazard determining portion, are followed by steps S108–S112, S114–S116 and S118–S121, which correspond to the automatic brake application control portion and which are similar to steps S8–S12, S14–S16 and S18–S21 of FIG. 7. In step S114, the automatic brake application is effected so as to achieve the desired deceleration value Gc which is initially set to be $G_0$ in step S111.

The reference deceleration value $G_1$ is smaller than the initial deceleration value $G_0$. These values $G_1$ and $G_0$ are preferably determined depending upon the length of time between the moment of determination that it is impossible to prevent the vehicle collision and the moment of initiation of the automatic brake application. The reference deceleration value $G_1$ is made smaller than the initial deceleration value $G_0$ in order to permit the vehicle operator who does not want the automatic brake application, to terminate the automatic brake application in step S121 by turning OFF the collision-preventing-control selector switch SW1 or an automatic-brake-application canceling switch, after the automatic brake application is initiated with the initial deceleration value $G_0$.

Figure 13:
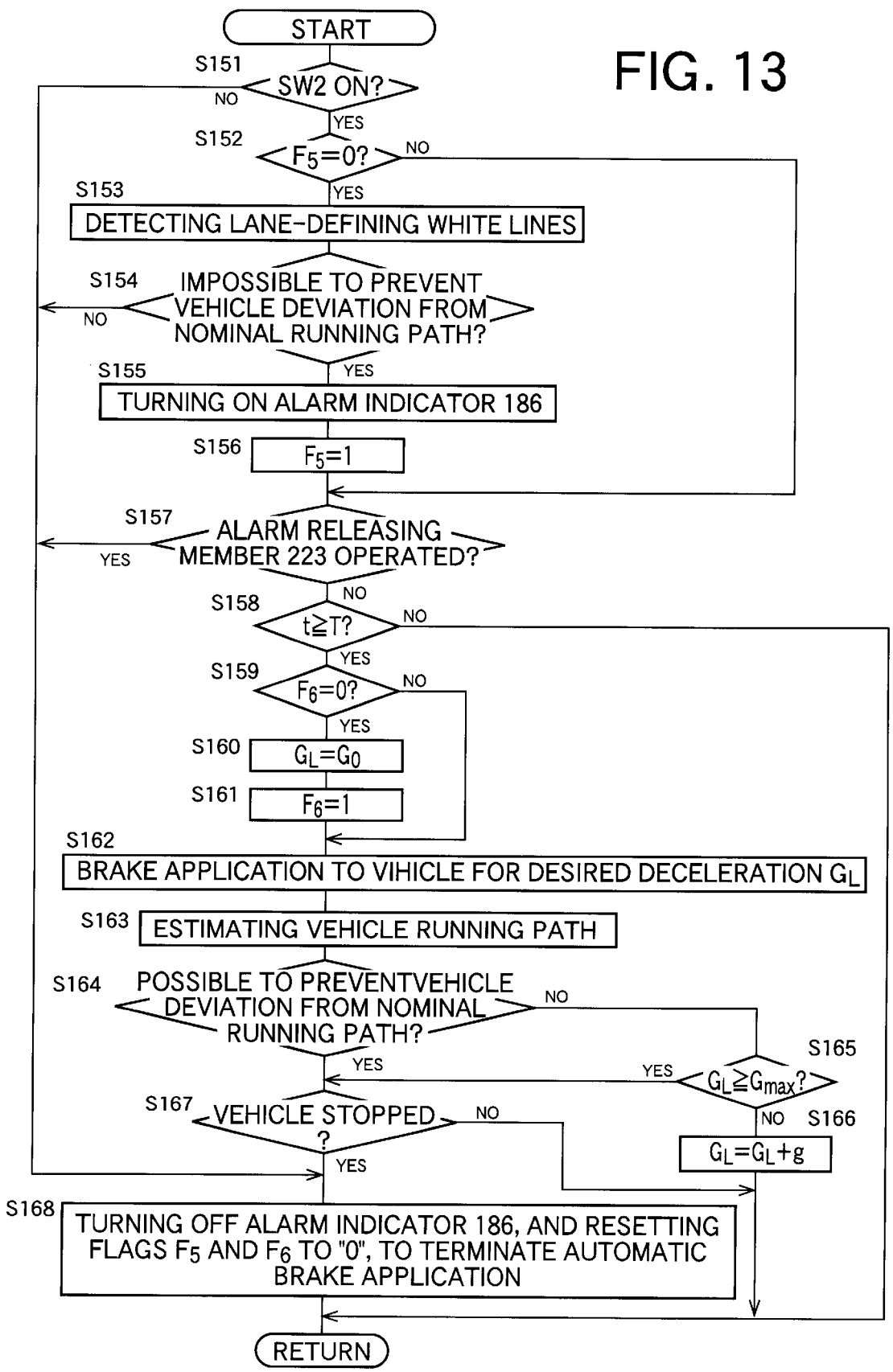
FIG. 13 is a flow chart illustrating a vehicle deviation preventing control routine executed in the second embodiment of FIG. 12, to prevent a deviation of the vehicle from the nominal running path.

The vehicle deviation preventing control routine of FIG. 13 is initiated with step S151 to determine whether the deviation-preventing-control selector switch SW2 is in the ON state. If an affirmative decision (YES) is obtained in step S151, the control flow goes to steps S152–S168, which are similar to steps S1–S3, S5–S15 and S17–S21 of FIGS. 7 and 8.

Described more specifically, when the affirmative decision is obtained in step S151, the control flow goes to steps S152–S156 to determine whether it is impossible to prevent a deviation of the vehicle from the nominal running path of the vehicle. If it is impossible to prevent the vehicle deviation, the control flow goes to steps S157–S168 wherein the automatic brake application is effected to decelerate the vehicle so as to establish the desired deceleration value $G_L$.

In the present second embodiment, the vehicle collision preventing control and the vehicle deviation preventing control are implemented independently of each other, to determine whether it is impossible to prevent a collision of the vehicle with an obstacle and a deviation of the vehicle from the nominal running path, and set the desired deceleration values $G_C$ and $G_L$ when it is determined that it is impossible to prevent the vehicle collision and deviation. Where the automatic brake application is required according to one of the vehicle collision preventing control and the vehicle deviation preventing control, the brake application is effected so as to achieve the appropriate one of the desired deceleration values $G_C$ and $G_L$. Where the automatic brake application is required according to both of the vehicle collision and deviation controls, the brake application is effected so as to achieve the larger one of the desired deceleration values $G_C$ and. The automatic brake application is implemented by supplying the pressurized fluid delivered from the pump device 14 to the wheel brake cylinders 20–23, as in the first embodiment.

In the present second embodiment, one of the vehicle collision preventing control and the vehicle deviation preventing control may or may not be followed by the other control, where it is determined that it is impossible to prevent the vehicle collision or deviation according to the above-indicated one control. The alarm indicator 186 may be activated when a determination that it is impossible to prevent the hazardous condition of the vehicle is made according to one of the two controls. Two alarm indicators may be provided for the respective two controls.

It will be understood from the foregoing description of the second embodiment that a portion of the brake control device 150 assigned to implement steps S101–S121 of FIG. 12 constitutes a vehicle-collision preventing device for preventing a collision of the vehicle with an obstacle, while a portion of the brake control device 150 assigned to implement steps S151–S168 constitutes a vehicle-deviation preventing device for preventing a deviation of the vehicle from the nominal running path. It will also be understood that a portion of the brake control device 150 assigned to implement steps SS103 and S104 constitutes a vehicle-collision determining device to determine whether it is impossible to prevent the vehicle collision, while a portion of the brake control device 150 assigned to implement steps S153 and S154 constitutes a vehicle-deviation determining device for determining whether it is impossible to prevent the vehicle deviation.

A third embodiment of the present invention will be described. The vehicle stability control apparatus according to the present third embodiment is almost identical in hardware arrangement with that of the first embodiment. There will be described only a portion of the software arrangement of the third embodiment which is different from that of the first embodiment.

Like the second embodiment of FIGS. 12 and 13, the third embodiment uses the collision-preventing-control selector switch SW1 and the deviation-preventing-control selector switch SW2, so that the vehicle operator may select one or both of these two controls. The second embodiment of FIGS. 12 and 13 is adapted to implement the vehicle collision preventing control and the vehicle deviation preventing control concurrently with each other. In the third embodiment, the hazard preventing control routine consists of four portions: a vehicle-collision determining portion illustrated in the flow chart of FIG. 14; a collision-preventing brake application control portion illustrated in the flow chart of FIG. 15; a vehicle-deviation determining portion illustrated in the flow chart of FIG. 16; and a deviation-preventing brake application control portion illustrated in the flow chart of FIG. 17. These four portions of the control routine are executed sequentially.

Figure 14:
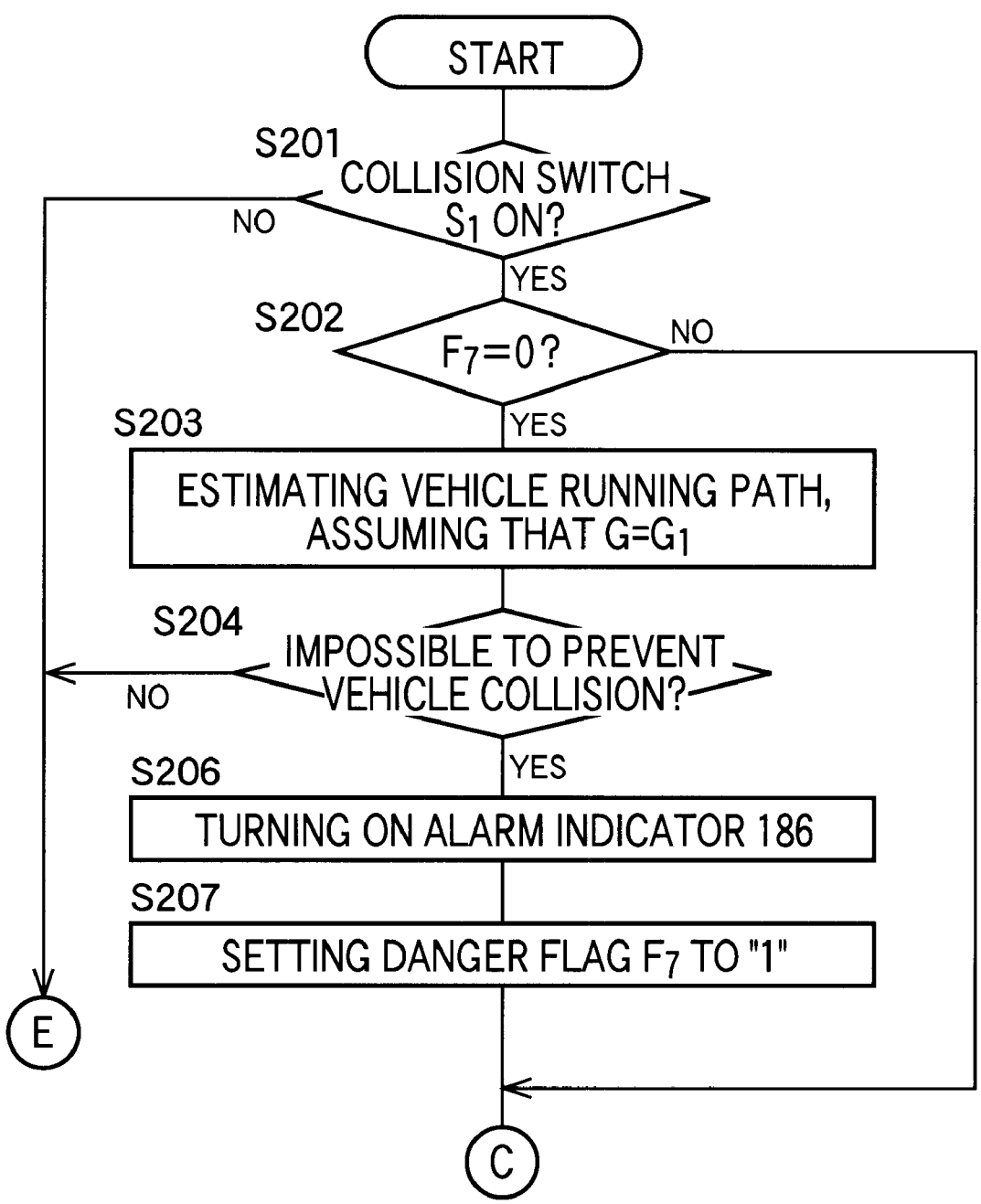
FIG. 14 is a flow chart illustrating a vehicle-collision determining portion of a hazard preventing control routine executed in a third embodiment of this invention.

Steps S201–S204, S206 and S207 of the vehicle-collision determining portion of FIG. 14 of the hazard preventing control routine are similar to steps S101–S104, S106 and S107 of the vehicle collision preventing control routine of FIG. 12 of the second embodiment. In the second embodiment of FIGS. 12 and 13, the automatic brake application control is not implemented when the collision-preventing-control selector switch SW1 is in the OFF state. When the selector switch SW1 is in the OFF state in the present third embodiment, a negative decision (NO) is obtained in step S201, and the control flow goes to step S220 of the vehicle-deviation determining portion of FIG. 16, while skipping the following steps of the vehicle-collision determining portion of FIG. 14 and the collision-preventing brake application control portion of FIG. 15.

When the selector switch SW1 is in the ON state, an affirmative decision (YES) is obtained in step S201, and the control flow goes to steps S202–S204 and S206–S207. Before a HAZARD flag F7 is set to "1", namely, as long as an affirmative decision (YES) is obtained in step S202, steps S203 and S204 are implemented to determine whether it is impossible to prevent a collision of the vehicle with an obstacle. If it is determined that it is possible to prevent the vehicle collision, the control flow goes to the vehicle-deviation determining portion of FIG. 16. If it is determined that it is impossible to prevent the vehicle collision, an affirmative decision (YES) is obtained in step S204, and the control flow goes to steps S206 and S207 to activate the alarm indicator 186 and set the HAZARD flag F3 to "1".

Figure 15:
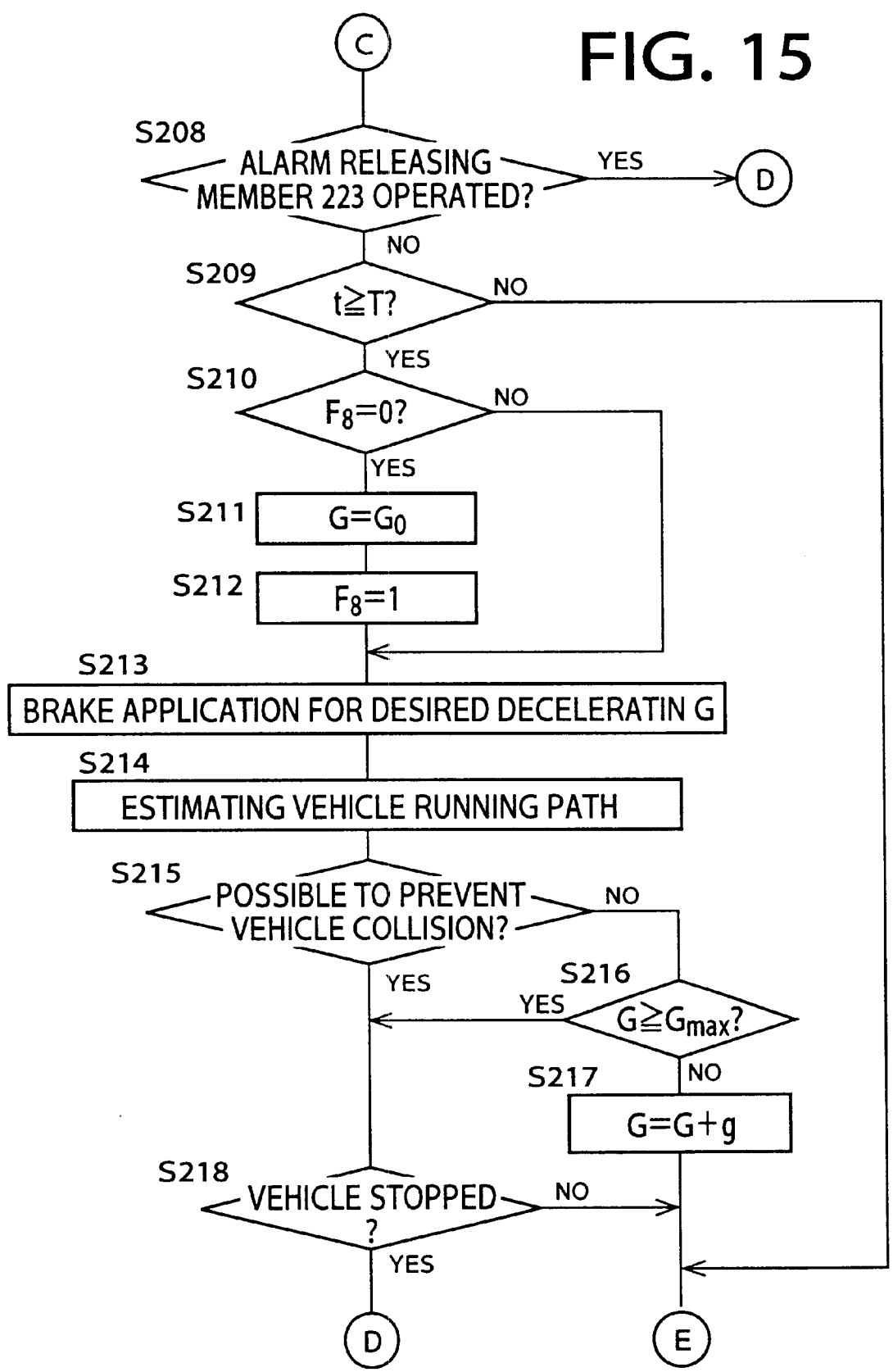
FIG. 15 is a flow chart illustrating a vehicle-collision preventing brake application control portion of the hazard preventing control routine of FIG. 14.
Figure 16:
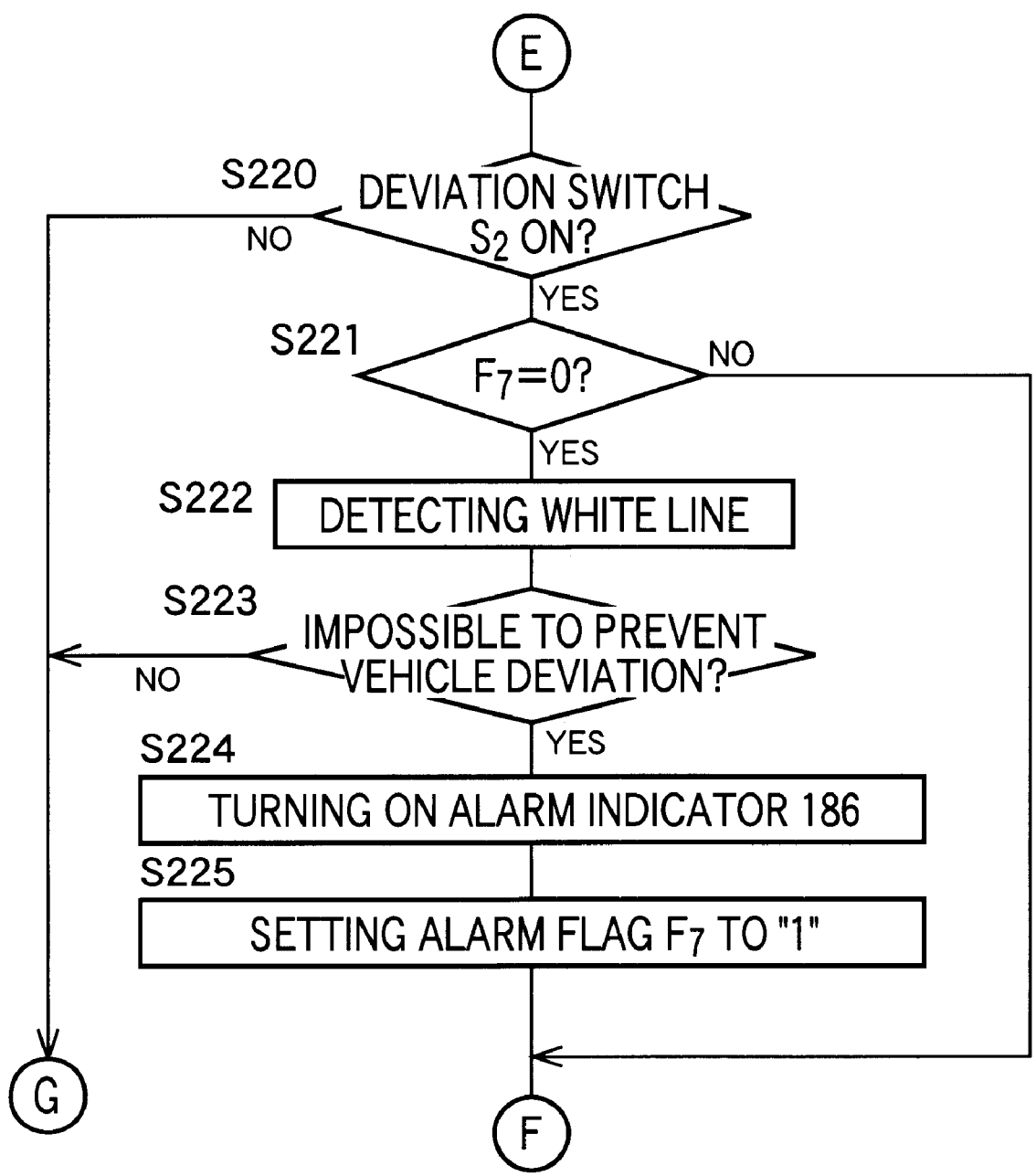
FIG. 16 is a flow chart illustrating a vehicle-deviation determining portion of the hazard preventing control routine of FIG. 14.

In the present third embodiment, the HAZARD flag F7 is used for the vehicle-deviation determining portion of FIG. 16 as well as the vehicle-collision determining portion of FIG. 14. Accordingly, if it is determined that it is impossible to prevent a deviation of the vehicle from the nominal running path, the alarm indicator 186 is activated and the flag F7 is also set to "1". See steps S223–S225 of FIG. 16. Once the flag F7 is set to "1" (once the alarm indicator 186 is activated), steps S208–S218 of FIG. 15 and steps S226–S237 of FIG. 17 are implemented while steps S203, S204, S206, S207 of FIG. 14 and steps S222–S225 of FIG. 16 are skipped.

Figure 17:
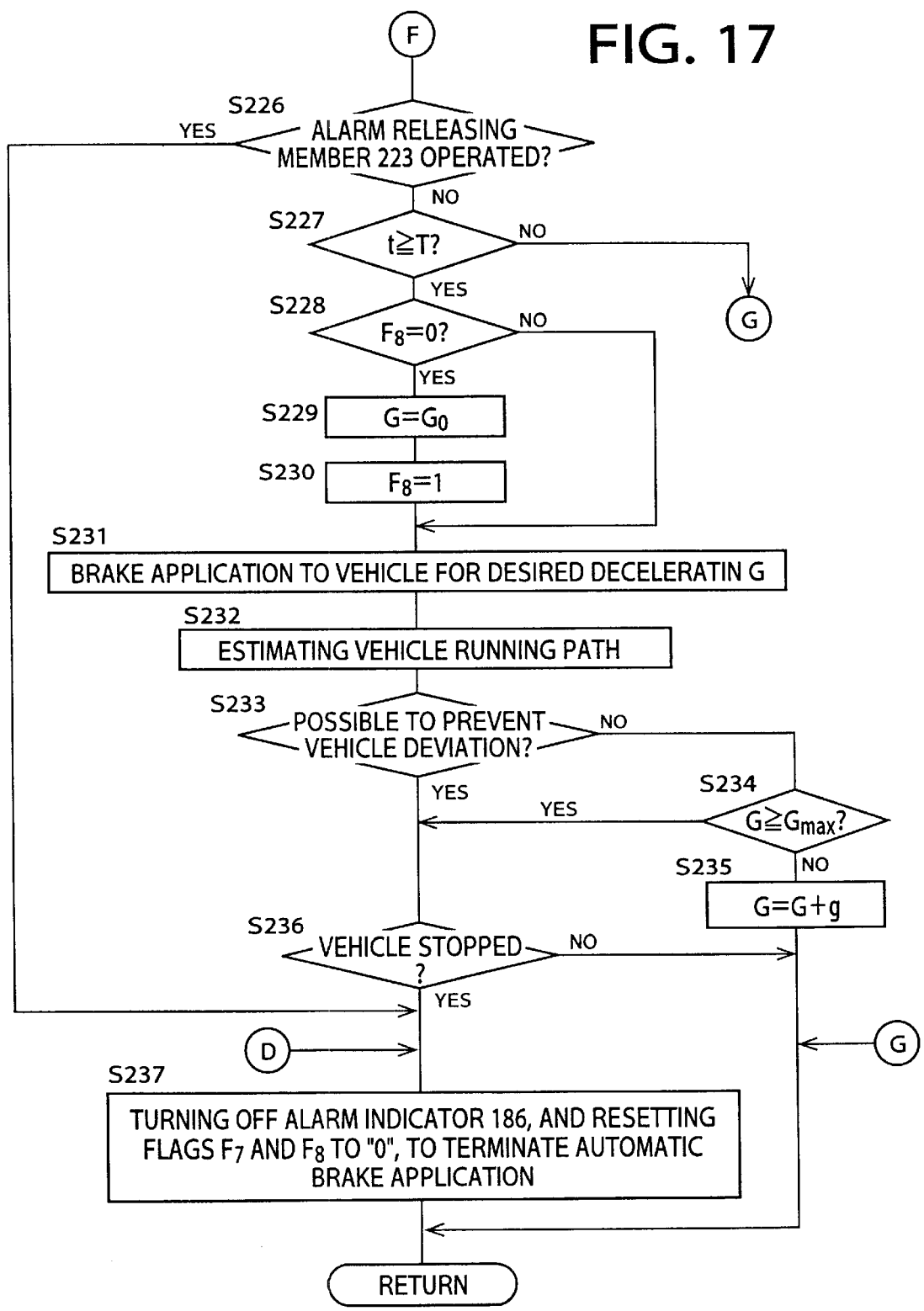
FIG. 17 is a flow chart illustrating a vehicle-deviation preventing brake application control portion of the hazard preventing control routine of FIG. 14.

It will thus be understood that once the alarm indicator 186 is activated, the collision-preventing brake application control portion of FIG. 15 and the deviation-preventing brake application control portion of FIG. 17 are alternately implemented. Even if one of the collision-preventing brake application control portion of FIG. 15 and the deviation-preventing brake application control portion of FIG. 17 determines that the brake application to the vehicle so as to achieve the desired deceleration value G makes it possible to prevent a hazardous running condition of the vehicle (vehicle collision or deviation), the other brake application control portion may determine that the brake application does not make it possible to prevent the hazardous running condition of the vehicle. In this case, the desired vehicle deceleration value G is incremented by a predetermined amount "g" in step S217 or S235, to increase the total braking force applied to the vehicle by the automatic brake application in step S213 or S231. Thus, the automatic brake application is continued as long as at least one of the collision-preventing and deviation-preventing brake application control portions of FIGS. 15 and 17 determines that the automatic brake application does not make it possible to prevent the hazardous running condition of the vehicle. Further, the desired vehicle deceleration value G to be obtained by the automatic brake application is incremented while it is determined that the vehicle collision or deviation cannot be prevented.

While the collision-preventing control selector switch SW1 and the deviation-preventing control selector switch SW2 are both placed in the ON state in the present third embodiment, the alarm indicator 186 is activated when at least one of the vehicle-collision determining portion of FIG. 14 and the vehicle-deviation determining portion of FIG. 16 determines that it is impossible to prevent at least one of the vehicle collision and deviation. Once the alarm indicator 186 is activated in step S206 or S224, the two brake application control portions of FIGS. 15 and 17 are executed alternately, irrespective of the brake application control portion in which the alarm indicator 186 has been activated, so that the automatic brake application to the vehicle is continued with an incremental increase of the total braking force by an incremental increase of the desired vehicle deceleration value G, until the total braking force is increased to a value that can prevent the vehicle collision or deviation. Accordingly, the present third embodiment does not require the two desired vehicle deceleration values $G_C$ and $G_L$ as used in the second embodiment of FIGS. 12 and 13, and does not require comparison of those two desired deceleration values to select the higher one when it is determined that it is impossible to prevent both the vehicle collision and the vehicle deviation.

While the two presently preferred embodiments of the vehicle stability control apparatus of the invention as used in the hydraulically operated braking system have been described, the vehicle stability control apparatus of the present invention is equally applicable to a braking system which is not hydraulically operated. An example of such non-hydraulically-operated braking system is shown in FIG. 18.

Figure 18:
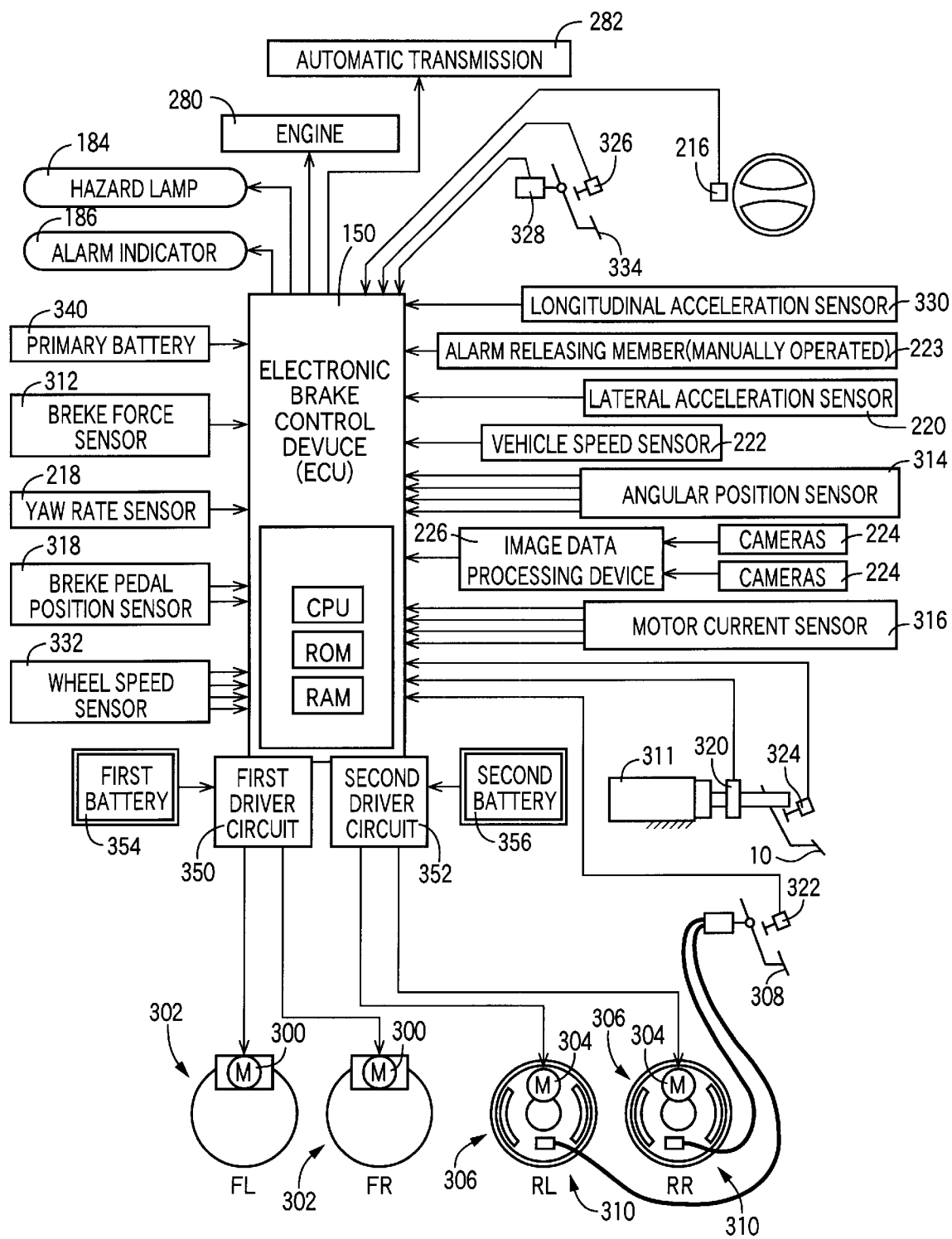
FIG. 18 is a block diagram showing a braking system including a vehicle running stability control apparatus, which is constructed according to a further embodiment of this invention.

The braking system shown in FIG. 18 is almost identical in construction with a braking system as disclosed in JP-A-11-170991 and U.S. patent application Ser. No. 09/208,728. The same reference signs as used in FIG. 1 are be used in FIG. 18 to identify the functionally corresponding elements. The instant braking system is adapted for use on a four-wheel drive vehicle having a front left wheel FL, a front right wheel FR, a rear left wheel RL and a rear right wheel RR. The vehicle includes a drive power source in the form of an internal combustion engine 280, and a power transmitting device in the form of an automatic transmission (AT) 282.

Each of the front left and right wheels FL, FR is provided with an electrically operated disc brake 302 which uses an ultrasonic motor 300 as a drive source and which does not use any working fluid for brake application. On the other hand, each of the rear left and right wheels RL, RR is provided with an electrically operated drum brake 306 serving as a normal brake, and a mechanically operated drum brake 310 serving as an emergency brake. The drum brake 306 uses a DC motor 304 as a drive source and does not use any working fluid. The drum brake 306 is operated in response to an operation of the brake pedal 10. The mechanically operated drum brake 36 is operated in response to an operation of an emergency brake pedal 308. This drum brake 310 does not use any working fluid, either.

The brake pedal 10 is operatively connected to a stroke simulator 311, which permits the brake pedal 10 to have an operating stroke corresponding to an amount of operating force acting thereon.

The brake control device 150 receives output signals of the alarm releasing member 223, a brake force sensor 312, an angular position sensor 314, and a motor current sensor 316. The brake force sensor 312 is provided for each of the electrically operated disc and drum brakes 302, 304, for detecting a physical quantity relating to the braking force generated by each brake 302, 304. The angular position sensor 312 is provided for detecting the angular position of the motor 300, 304 used to drive each brake 302, 304. The motor current sensor 316 is provided for detecting an electric current applied to the motor 300, 304.

The brake control device 150 also receives output signals of a brake pedal position sensor 318, an operating force sensor 320, an emergency brake pedal switch 322, a brake pedal switch 324, an accelerator pedal switch 326, an accelerator-pedal operating amount sensor 328, a longitudinal acceleration 330 and wheel speed sensors 332, as well as the steering angle sensor 216, yaw rate sensor 218, lateral acceleration sensor 220 and image data processing device 226, which have been described above with respect to the first embodiment. As in the first embodiment, the image data processing device 226 is adapted to process image data obtained by the cameras 224.

The present braking system includes a primary battery 340 which serves as a power source for operating all of the electrically operated elements of the system except the motors 300.

The operating force sensor 320 is provided to detect the operating force acting on the brake pedal 10. The emergency brake pedal switch 322 is provided to detect an operation of the emergency brake in the form of the mechanically operated drum brakes 310. The switch 322 generates an OFF signal (first signal) when the emergency brake pedal 308 is placed in the non-operated position, and an ON signal (second signal) when the emergency brake pedal 308 is placed in an operated position. The brake pedal switch 324 is provided to detect an operation of the normal brake in the form of the electrically operated drum brakes 306. The switch 324 generates an OFF signal (first signal) when the brake pedal 10 is in the non-operated position, and an ON signal (second signal) when the brake pedal 10 is in an operated position. The accelerator-pedal operating amount sensor 328 is provided to detect a desired amount of operation of an accelerating member in the form of the accelerator pedal 334. The longitudinal acceleration sensor 330 is provided to detect the deceleration value of the vehicle in the longitudinal direction. The wheel speed sensors 332 are provided to detect the rotating speeds of the wheels FL, FR, RL and RR. The angular position sensor 314 is provided to detect the angular position of each motor 300, 304. The motor current sensor 316 is provided to detect an amount of electric current flowing through the coil winding of each motor 300, 304.

To the output portion of the brake control device 150, there are connected a first driver circuit 350 and a second driver circuit 352. The first driver circuit 350 is provided between a first battery 354 serving as a power source and the ultrasonic motors 300 of the electrically operated disc brakes 302 for the front wheels. On the other hand, the second driver circuit 352 is provided between a second battery 356 serving as a power source and the DC motors 304 of the electrically operated drum brakes 306 for the rear wheels. When the brake pedal 10 is operated, the brake control device 150 applies control signals to the driver circuits 350, 352 so that an electric current is applied from the batteries 354, 356 to the motors 300, 304.

The brake control device 150 is also adapted to apply control signals to the hazard lamp 184 and the alarm indicator 186.

In the braking system of FIG. 18, the brake control device 150 executes a vehicle stability control so as to prevent a hazardous running condition of the vehicle by automatic brake application to the vehicle when it is determined that a vehicle running stability control does not permit the vehicle to be controlled so as to prevent a collision of the vehicle with an obstacle or a deviation of the vehicle from the nominal running path.

It is to be understood that the present invention may be embodied with various other changes, modifications and improvements, which may occur to those skilled in the art, without departing from the spirit and scope of the invention defined in the following claims:

What is claimed is:

1. A vehicle stability control apparatus comprising a vehicle running stability control device for controlling an automotive vehicle for stable running of the vehicle, and a braking device including a plurality of brakes for braking respective wheels of the vehicle, said vehicle running stability control device activating the braking device to provide turning stability control through a differential application of braking force to at least one of the wheels, said apparatus further comprising:

a hazard detecting device for detecting a hazardous condition of the vehicle, the hazardous condition being determined when the turning stability control is insufficient to avoid an undesirable event due to a motion of the vehicle; and an automatic brake application device operable to activate said braking device when said hazard detecting device to brake said vehicle has detected said hazardous condition of the vehicle at least during an operation of said vehicle running stability control device, the manner of activation of said braking device by said automatic brake application device being different from a manner of activation of said braking device by said turning stability control device.

2. A vehicle stability control apparatus according to claim 1, wherein said hazard detecting device comprises an obstacle detecting device for detecting an obstacle in front of the vehicle as seen in a running direction of the vehicle, said automatic brake application device being operable to activate said braking device, when an output of said obstacle detecting device at least during an operation of said vehicle running stability control device indicates that there is a risk of a collision of the vehicle with said obstacle.

3. A vehicle stability control apparatus according to claim 2, wherein said automatic brake application device is operated during an operation of the vehicle running stability control device, when the output of said obstacle detecting device indicates that there is said risk of the collision of the vehicle with said obstacle.

4. A vehicle stability control apparatus according to claim 1, wherein said hazard detecting device includes a vehicle-deviation determining device for determining whether there is a risk of a deviation of the vehicle from a nominal running path of the vehicle, said automatic brake application device being operable to activate said braking device, when an output of said vehicle-deviation determining device at least during an operation of said vehicle running stability control device indicates that there is said risk of the deviation of the vehicle from said nominal running path.

5. A vehicle stability control apparatus according to claim 4, wherein said automatic brake application device is operated during an operation of said vehicle running stability control device, when the output of said vehicle-deviation determining device indicates that there is said risk of the deviation of the vehicle from said nominal running path.

6. A vehicle stability control apparatus according to claim 4, wherein said vehicle-deviation determining device includes a lane detecting device for detecting a lane-defining line which defines a traffic lane on which the vehicle is running, said vehicle-deviation determining device determining that there is a risk of the deviation of the vehicle from said nominal running path, when an angle between said lane-defining line detected by said lane detecting device and a longitudinal direction of the vehicle is larger than a predetermined upper limit.

7. A vehicle stability control device according to claim 6, wherein said vehicle-deviation determining device further includes a running-path estimating device for estimating an actual running path of the vehicle, on the basis of a yaw rate of the vehicle.

8. A vehicle stability control device according to claim 6, wherein said vehicle-deviation determining device includes an image obtaining device for obtaining image data representative of an image of a scene in front of the vehicle as seen in a longitudinal direction of the vehicle, and an image-data processing device for processing said image data to determine a lane-defining line which defines a traffic lane on which the vehicle is running.

9. A vehicle stability control device according to claim 1, further comprising running stability control terminating device for terminating the operation of said vehicle running stability control device when said braking device is activated by said automatic brake application device.

10. A vehicle stability control apparatus according to claim 1, wherein said automatic brake application device controls said braking device to brake all of a plurality of wheels of the vehicle such that a total braking force generated by said all of said plurality of wheels is equal to a predetermined maxim value.

11. A vehicle-collision preventing apparatus for preventing a collision of an automotive vehicle with an obstacle, said automotive vehicle having a running stability control device for effecting turning stability control of the vehicle, said vehicle-collision preventing apparatus comprising:

a braking device for applying a brake to the vehicle;
a running-path estimating device for estimating a running path of the vehicle;
an obstacle detecting device for detecting an obstacle existing in front of the vehicle and in said running path of the vehicle estimated by said running-path estimating device;
a vehicle speed detecting device for detecting a running speed of the vehicle;
a vehicle-collision determining device for determining, on the basis of said running speed detected by said vehicle speed detecting device, whether there is a risk of a collision of the vehicle with said obstacle detected by said obstacle detecting device on an assumption that the vehicle is braked at a predetermined reference deceleration value;
an automatic brake application device operable to activate said braking device to brake said vehicle at a deceleration value whose absolute value is larger than that of said reference deceleration value, when said vehicle-collision determining device has determined there is said risk of the collision of the vehicle with said obstacle; and
a running stability control terminating device for terminating a turning stability control of the vehicle by said braking device through a differential application of braking force to at least one of wheels of the vehicle when said braking device is activated by said automatic brake application device during said turning stability control.

12. A vehicle-collision preventing apparatus according to claim 11, wherein said running-path estimating device, said vehicle speed detecting device and said vehicle-collision determining device are kept operated even after an operation of said braking device is initiated by said automatic brake application device, said vehicle-collision determining device including deceleration increasing means for increasing the absolute value of the deceleration value to be established by the operation of the braking device under the control of said automatic brake application device, as long as said vehicle-collision determining device keeps determining that there is said risk of the collision of the vehicle with said obstacle.

13. A vehicle-deviation preventing apparatus for preventing a deviation of an operator-controlled automotive vehicle from a nominal running path of the vehicle, said automotive vehicle having a running stability control device for effecting turning stability control of the vehicle, said vehicle-deviation preventing apparatus comprising:

a braking device for applying a brake to the vehicle;
a running-path detecting device for detecting a nominal running path of the vehicle;
a vehicle-deviation determining device for determining whether there is a risk of a deviation of the vehicle from the detected nominal running path;
an automatic brake application vehicle operable to activate said braking device to brake said vehicle when said vehicle-deviation determining device has determined that there is a risk of the vehicle deviation from said detected nominal running path; and
running stability control terminating device for terminating a turning stability control of the vehicle by said braking device through a differential application of braking force to at least one of wheels of the vehicle, when said braking device is activated by said automatic brake application device during said turning stability control.

14. A vehicle-deviation preventing apparatus according to claim 13, further comprising an alarm indicator device operable when said vehicle-deviation determining means has determined that there is said risk of the deviation of the vehicle, to warn an operator of the vehicle that there is said risk.

15. A vehicle-deviation preventing apparatus according to claim 13, further comprising an operator-controlled member, and an automatic-brake-application inhibiting device for inhibiting an operation of said automatic brake application device when said operator-controlled member is operated.

16. A vehicle-deviation preventing apparatus according to claim 13, further comprising:

an alarm indicator device operable when said vehicle-deviation determining device has determined that there is said risk of the deviation of the vehicle, to warn an operator of the vehicle that there is said risk;

an operator-controlled member; and an automatic-brake-application inhibiting device for inhibiting an operation of said automatic brake application device when said operator-controlled member is operated, and wherein said automatic brake application device activates said braking device when a predetermined time has passed without an operation of said operator-controlled member after said alarm indicator device is operated.

* * * * *

UNITED STATES PATENT AND TRADEMARK OFFICE
CERTIFICATE OF CORRECTION

PATENT NO. : 6,488,109 B1
DATED : December 3, 2002
INVENTOR(S) : Munenaga Igaki and Masakatsu Nonaka It is certified that error appears in the above-identified patent and that said Letters Patent is hereby corrected as shown below:

Title page,
Immediately following the ABSTRACT,
"16 claims" should read -- 15 claims --;

Column 30,
Line 44, delete "and";
Line 46, after first occurrence of "device", insert -- to brake said vehicle --;
Line 46, after "hazard", insert -- condition --;
Line 47, delete "to brake said vehicle";
Line 53, delete "device." and insert thereto -- device; and
     a running stability control terminating device for terminating the
operation of said vehicle running stability control device when said braking device
is activated by said automatic brake application device. --;

Column 31,
Lines 44-48, cancel claim 9 in its entirety;
Line 49, change "10" to -- 9 --;
Line 55, change "maxim" to -- maximum --;
Line 56, change "11" to -- 10 --;

Column 32,
Line 23, change "12" to -- 11 --;
Line 24, change "11" to -- 10 --;
Lines 37 and 63, change "13" to -- 12 --;
Line 62, change "14" to -- 13 --;

UNITED STATES PATENT AND TRADEMARK OFFICE
CERTIFICATE OF CORRECTION

PATENT NO. : 6,488,109 B1
DATED : December 3, 2002
INVENTOR(S) : Munenaga Igaki and Masakatsu Nonaka It is certified that error appears in the above-identified patent and that said Letters Patent is hereby corrected as shown below:

<u>Column 33,</u>
Line 1, change "15" to -- 14 --;
Lines 2 and 8, change "13" to -- 12 --; and
Line 7, change "16" to -- 15 --;

Signed and Sealed this

Fourteenth Day of October, 2003

JAMES E. ROGAN
*Director of the United States Patent and Trademark Office*